US012750767B2

(12) United States Patent
Kalkunte et al.

(10) Patent No.: US 12,750,767 B2
(45) **Date of Patent: *Sep. 29, 2026**

(54) EDGE DEVICE AND METHOD FOR HANDLING SERVICE FOR MULTIPLE SERVICE PROVIDERS

(71) Applicant: PELTBEAM INC., Sherman Oaks, CA (US)

(72) Inventors: Venkat Kalkunte, Saratoga, CA (US); Mehdi Hatamian, Mission Viejo, CA (US)

(73) Assignee: Peltbeam Inc., Sherman Oaks, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/539,115

(22) Filed: Feb. 13, 2026

(65) Prior Publication Data

US 2026/0190017 A1 Jul. 2, 2026

Related U.S. Application Data

(63) Continuation of application No. 19/344,610, filed on Sep. 30, 2025, which is a continuation of application (Continued)

(51) Int. Cl.
*H04W 48/16* (2009.01)
*H04L 67/1001* (2022.01)
(Continued)

(52) U.S. Cl.
CPC ........... *H04W 48/16* (2013.01); *H04W 48/18* (2013.01); *H04W 64/003* (2013.01); (Continued)

(58) Field of Classification Search
None
See application file for complete search history.

(56) References Cited

U.S. PATENT DOCUMENTS

| | | | |
|---|---|---|---|
| D135,528 | S | 4/1943 | Meyer |
| D195,511 | S | 6/1963 | Brown |

(Continued)

OTHER PUBLICATIONS

Survey of Online Learning Techniques for Beam Management in mmWave Massive Systems (Year: 2026).*

(Continued)

*Primary Examiner* — Joseph E Avellino
*Assistant Examiner* — Anindita Sen
(74) *Attorney, Agent, or Firm* — CHIP LAW GROUP

(57) ABSTRACT

A central cloud server that includes a processor that obtains sensing information from a plurality of edge devices at different locations, obtains beam alignment information from the plurality of edge devices, and trains a machine learning model on training data. The training data comprises the obtained sensing information as input features and the beam alignment information as learning labels for different times-of-day. The machine learning model is trained to determine patterns that maps the input features to the learning labels and to generate a connectivity enhanced database. The connectivity enhanced database specifies a plurality of time-of-day specific uplink and downlink beam alignment-wireless connectivity relationships for a surrounding area of each edge device of the plurality of edge devices.

20 Claims, 8 Drawing Sheets

Related U.S. Application Data

No. 19/194,083, filed on Apr. 30, 2025, now Pat. No. 12,471,012, which is a continuation of application No. 18/967,703, filed on Dec. 4, 2024, now Pat. No. 12,363,623, which is a continuation of application No. 17/661,037, filed on Apr. 27, 2022, now Pat. No. 12,289,670, which is a continuation of application No. 17/453,141, filed on Nov. 1, 2021, now Pat. No. 11,356,936, which is a continuation of application No. 17/341,978, filed on Jun. 8, 2021, now Pat. No. 11,191,013.

(51) Int. Cl.

*H04W 48/18* (2009.01)
*H04W 64/00* (2009.01)
*H04W 72/0453* (2023.01)
*H04W 76/10* (2018.01)

(52) U.S. Cl.

CPC ....... *H04W 72/0453* (2013.01); *H04W 76/10* (2018.02); *H04L 67/1001* (2022.05)

(56) References Cited

U.S. PATENT DOCUMENTS

| | | | | |
|---|---|---|---|---|
| D396,724 | S | 8/1998 | Herbst et al. | |
| 5,838,674 | A | 11/1998 | Forssen et al. | |
| D437,243 | S | 2/2001 | Cessac | |
| D570,296 | S | 6/2008 | Wipf et al. | |
| 7,805,610 | B2 * | 9/2010 | Lapstun | H04N 1/00204 713/168 |
| 8,024,084 | B2 * | 9/2011 | Breed | B60N 2/267 701/31.4 |
| 8,675,667 | B1 | 3/2014 | DeMartino | |
| RE47,908 | E * | 3/2020 | Hoffberg | H04N 21/4532 |
| 10,827,434 | B1 | 11/2020 | Marupaduga et al. | |
| 11,159,958 | B1 | 10/2021 | Hatamian et al. | |
| 11,191,013 | B1 | 11/2021 | Kalkunte et al. | |
| 2008/0211779 | A1 * | 9/2008 | Pryor | G06F 3/0425 345/173 |
| 2012/0030393 | A1 | 2/2012 | Ganesh et al. | |
| 2012/0135776 | A1 | 5/2012 | Chu et al. | |
| 2012/0150651 | A1 * | 6/2012 | Hoffberg | H04N 21/466 705/14.58 |
| 2014/0204902 | A1 | 7/2014 | Maltsev et al. | |
| 2016/0095016 | A1 | 3/2016 | El-Refaey et al. | |
| 2019/0007788 | A1 | 1/2019 | Russell | |
| 2019/0239092 | A1 | 8/2019 | Zhou et al. | |
| 2019/0293781 | A1 | 9/2019 | Bolin et al. | |
| 2019/0363843 | A1 | 11/2019 | Gordaychik | |
| 2020/0008044 | A1 | 1/2020 | Poornachandran et al. | |
| 2020/0150263 | A1 | 5/2020 | Eitan et al. | |
| 2020/0169880 | A1 | 5/2020 | Wen et al. | |
| 2020/0187172 | A1 | 6/2020 | Wang et al. | |
| 2020/0220905 | A1 | 7/2020 | Park et al. | |
| 2020/0241306 | A1 | 7/2020 | Elaan et al. | |
| 2020/0295914 | A1 | 9/2020 | Hormis et al. | |
| 2020/0322812 | A1 | 10/2020 | Shi et al. | |
| 2020/0351882 | A1 | 11/2020 | Furuichi | |
| 2020/0358185 | A1 | 11/2020 | Tran et al. | |
| 2020/0403687 | A1 | 12/2020 | Raghavan et al. | |
| 2020/0403689 | A1 | 12/2020 | Rofougaran et al. | |
| 2021/0036752 | A1 | 2/2021 | Tofighbakhsh et al. | |
| 2021/0058826 | A1 | 2/2021 | Mao et al. | |
| 2021/0099890 | A1 | 4/2021 | Imanilov et al. | |
| 2021/0119962 | A1 | 4/2021 | Ramia et al. | |
| 2021/0159946 | A1 | 5/2021 | Raghavan et al. | |
| 2021/0243821 | A1 | 8/2021 | Palamara et al. | |
| 2021/0297410 | A1 | 9/2021 | Zhou | |
| 2021/0337452 | A1 | 10/2021 | Furuichi et al. | |
| 2022/0038249 | A1 | 2/2022 | Raghavan et al. | |
| 2022/0116791 | A1 | 4/2022 | Lin et al. | |
| 2022/0225121 | A1 | 7/2022 | Wanuga et al. | |
| 2022/0337294 | A1 | 10/2022 | Sethi et al. | |
| 2022/0365194 | A1 | 11/2022 | Pp et al. | |
| 2023/0007503 | A1 | 1/2023 | Balasubramanian et al. | |
| 2023/0314554 | A1 | 10/2023 | Kalantari et al. | |

OTHER PUBLICATIONS

Beam Alignment for Millimeter Wave Wireless Communications: A Multiscale Approach (Year: 2021).*

Notice of Allowance for U.S. Appl. No. 19/365,348 dated Apr. 7, 2026.

"View on 5G Architecture" Version 3.0, by 5G PPP, dated Jun. 2019 (Year: 2019).

Ex Parte Quayle Office Action in U.S. Appl. No. 29/791,438 dated Apr. 8, 2022.

Gupta et al., "iFogSim: A Toolkit for Modeling and Simulation of Resource Management Techniques in Internet of Things, Edge and FogComputing Environments", 2016, p. 1-22.

Lv et al., "Diversified Technologies in Internet of Vehicles Under Intelligent Edge Computing", IEEE Transactions on Intelligent Transportation Systems, Apr. 2021, vol. 22, p. 2048-2059.

Non-Final Office Action for U.S. Appl. No. 18/070,619 dated Mar. 31, 2023.

Non-Final Office Action for U.S. Appl. No. 18/397,427 dated Oct. 31, 2024.

Non-Final Office Action for U.S. Appl. No. 19/220,147, dated Jul. 11, 2025.

Non-Final Office Action in U.S. Appl. No. 17/341,978 dated Aug. 30, 2021.

Non-Final Office Action in U.S. Appl. No. 17/453, 141 dated Jan. 4, 2022.

Notice of Allowance for U.S. Appl. No. 17/644,750 dated Apr. 17, 2024.

Notice of Allowance for U.S. Appl. No. 17/664,985 dated Aug. 22, 2022.

Notice of Allowance for U.S. Appl. No. 18/070,619 dated Jul. 20, 2023.

Notice of Allowance for U.S. Appl. No. 18/466,996 dated Nov. 15, 2023.

Notice of Allowance for U.S. Appl. No. 18/677,714 dated Aug. 6, 2024.

Notice of Allowance for U.S. Appl. No. 17/661,037 dated Jan. 6, 2025.

Notice of Allowance for U.S. Appl. No. 18/903,356 dated Nov. 14, 2024.

Notice of Allowance for U.S. Appl. No. 18/967,703 dated Jan. 30, 2025.

Notice of Allowance for U.S. Appl. No. 19/194,083, dated Jul. 30, 2025.

Notice of Allowance for U.S. Appl. No. 19/220,147, dated Oct. 3, 2025.

Notice of Allowance for U.S. Appl. No. 19/237,077, dated Aug. 6, 2025.

Notice of Allowance for U.S. Appl. No. 19/344,610 dated Jan. 16, 2026.

Notice of Allowance in U.S. Appl. No. 17/341,978 dated Oct. 27, 2021.

Notice of Allowance in U.S. Appl. No. 17/444,219 dated Dec. 8, 2021.

Notice of Allowance in U.S. Appl. No. 17/453,141 dated Feb. 9, 2022.

Notice of Allowance in U.S. Appl. No. 17/648,011 dated Apr. 12, 2022.

Notice of Allowance in U.S. Appl. No. 29/791,438 dated Jun. 14, 2022.

Notice of Allowance of U.S. Appl. No. 17/661,037 dated Sep. 16, 2024.

Ogbe, et al., "Iterative beam alignment algorithms for TDD MIMO systems", IEEE International Conference on Acoustics, Speech and Signal Processing, 2017, pp. 3469-3473.

Sabella et al., "Enabling Multi-access Edge Computing in Internet-of-Things: how to deploy ETSI MEC and oneM2M," ETSI White Paper No. #59, 1st edition—Jun. 2023, 32 pgs.

(56) References Cited

OTHER PUBLICATIONS

Non-Final Office Action for U.S. Appl. No. 19/434,273 dated May 12, 2026.

* cited by examiner

EDGE DEVICE AND METHOD FOR HANDLING SERVICE FOR MULTIPLE SERVICE PROVIDERS

CROSS-REFERENCE TO RELATED APPLICATIONS/INCORPORATION BY REFERENCE

This Patent Application makes reference to, claims priority to, claims the benefit of, and is a Continuation Application of U.S. patent application Ser. No. 19/344,610, filed on Sep. 30, 2025, which is a Continuation Application of U.S. patent Ser. No. 19/194,083, filed on Apr. 30, 2025, now U.S. Pat. No. 12,471,012, which is a Continuation Application of U.S. Pat. No. 12,363,623, issued on Jul. 15, 2025, which is a Continuation Application of U.S. Pat. No. 12,289,670, issued on Apr. 29, 2025, which is a Continuation Application of U.S. Pat. No. 11,356,936 issued on Jun. 7, 2022, which is a Continuation Application of U.S. Pat. No. 11,191,013, issued on Nov. 30, 2021.

FIELD OF TECHNOLOGY

Certain embodiments of the disclosure relate to wireless communication. More specifically, certain embodiments of the disclosure relate to an edge device and a method for handling service for multiple service providers.

BACKGROUND

Wireless telecommunication in modern times has witnessed advent of various signal transmission techniques and methods, such as use of beamforming and beam steering techniques, for enhancing capacity of radio channels. Latency and the high volume of data processing are considered prominent issues with next generation networks, such as 5G. Currently, the use of edge computing in the next generation networks, such as 5G and upcoming 6G, is an active area of research and many benefits has been proposed, for example, faster communication between vehicles, pedestrians, and infrastructure, and other communication devices. For example, it is proposed that close proximity of conventional edge devices to user equipment (UEs) may likely reduce the response delay usually suffered by UEs while accessing the traditional cloud. However, there are many open technical challenges for a successful and practical use of edge computing in the modern networks, especially in 5G or the upcoming 6G environment.

In a first example, it is known that fast and efficient beam management mechanism may be a key enabler in advanced wireless communication technologies, for example, in millimeter wave (5G) or the upcoming 6G communications, to achieve low latency and high data rate requirements. One major technical challenge of the mmWave beamforming is the initial access latency. During the initial access phase, a UE and or a conventional repeater device need to scan multiple beams to find a suitable beam for attachment, for example, using the standard beam sweeping operation in the initial access phase. This process may introduce considerable latency depending on the number of beams in a beam book and a baseband decoding hardware latency. Such latency becomes even more critical for mobile systems (e.g., when UEs are in motion) in which the channel, and hence beams or base stations, such as a gNodeB (gNB), may be rapidly changing. For example, currently, an average mmWave gNB handover time is on the order of 10-20 seconds, assuming about 500 meter of cell radius and a UE (e.g., a vehicle or a UE in the vehicle) travelling at the speed of 50 miles per hour (MPH), which is not desirable.

In a second example, Quality of Experience (QoE) is another open issue, which is a measure of a user's holistic satisfaction level with a service provider (e.g., Internet access, phone call, or other carrier network-enabled services). The challenge is how to ensure a seamless connectivity as well as QoE without significantly increasing infrastructure cost, which may be commercially unsustainable with present solutions.

In a third example, heterogeneity may be another issue, where many UEs may use different interfaces, radio access technologies (3G, 4G, 5G, or upcoming 6G), computing technologies (e.g., hardware and operating systems) to communicate with the edge cloud. Such heterogeneity in wireless communication may further aggravate the challenges in developing a solution that is practical and upgradable across different environment.

In yet another example, there is another challenge of high infrastructure cost incurred by each service provider separately to continuously upgrade their infrastructure to newer and advanced wireless communication technologies, for example, in 5G or the upcoming 6G communications, to achieve low latency and high data rate requirements. The high cost also substantially contributes to the delay in upgradation of their infrastructure, thereby leading a compromise on the QoE for the end users.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

An edge device and a method for handling service for multiple service providers for high performance and reliable communication, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Certain embodiments of the disclosure may be found in an edge device for handling service for multiple service providers for high performance and reliable communication. Certain embodiments of the disclosure may be further found in a method and a central cloud server for handling service for multiple service providers for high performance and reliable communication. Beneficially, the edge device has the capability to handle multiple service providers. Alternatively stated, a single edge device can service multiple UEs associated with different service providers, thereby reducing (i.e., optimizing) the total number of network nodes for each service provider required to be deployed or used to service the same number of UEs in one or more geographical areas. Further, the edge device, the central cloud server, and the method of the present disclosure ensure seamless connectivity as well as QoE while reducing the infrastructure cost by almost 50 percent considering just two different service providers. The edge device and the central cloud server are capable of seamlessly handling heterogeneity and support a plurality of different wireless carrier networks of different service providers for high performance and reliable communication. In the following description, reference is made to the accompanying drawings, which form a part hereof, and in which is shown, by way of illustration, various embodiments of the present disclosure.

Figure 1:
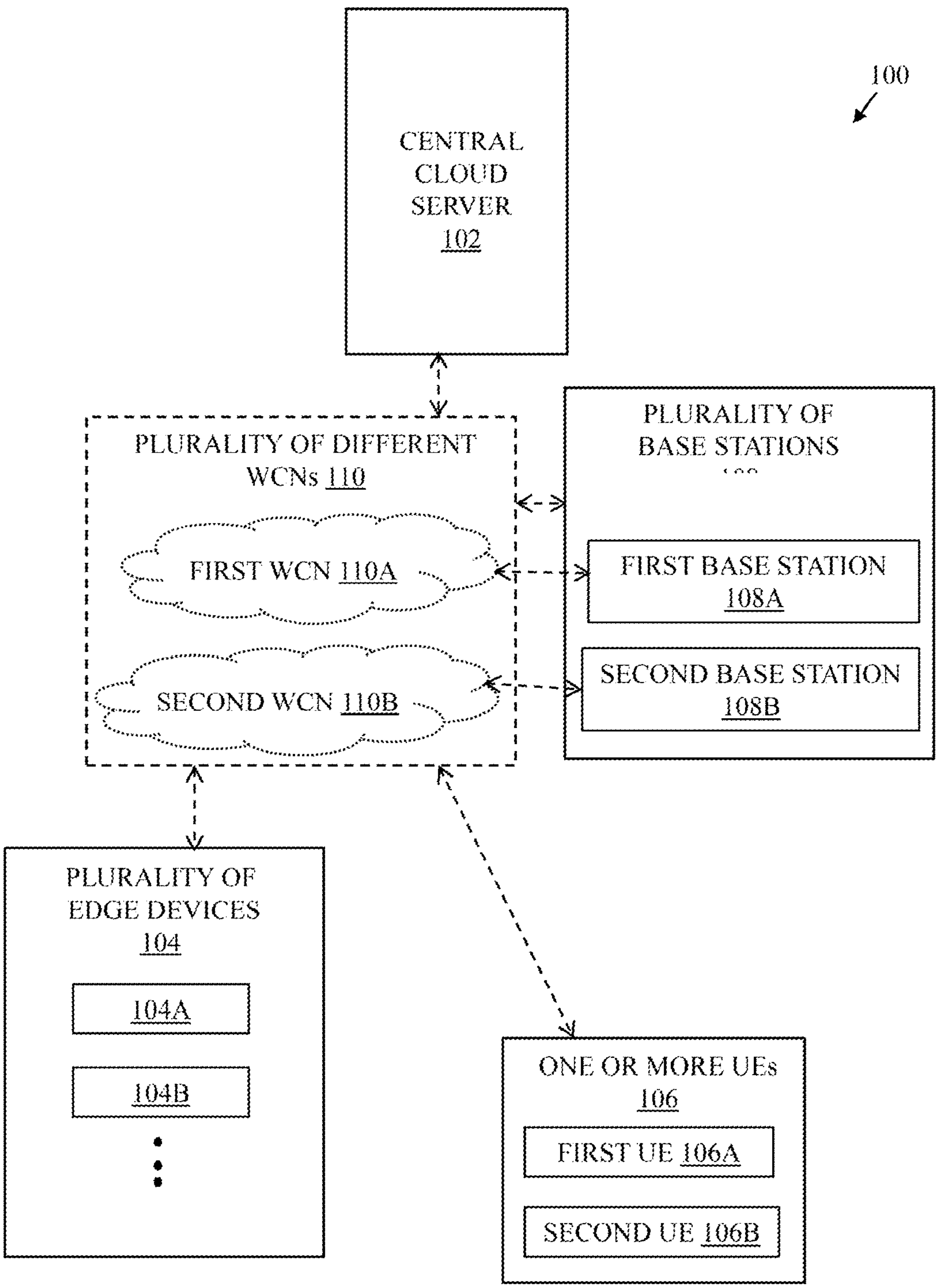
FIG. 1 is a network environment diagram illustrating various components of an exemplary communication system with a central cloud server and a plurality of edge devices, in accordance with an exemplary embodiment of the disclosure.

FIG. 1 is a network environment diagram illustrating various components of an exemplary communication system with a central cloud server and a plurality of edge devices, in accordance with an exemplary embodiment of the disclosure. With reference to FIG. 1, there is shown a block diagram 100 of a network environment that includes a central cloud server 102, a plurality of edge devices 104, one or more user equipment (UEs) 106, and a plurality of base stations 108. There is further shown a plurality of different WCNs 110, such as a first WCN 110A of a first service provider and a second WCN 110B of a second service provider.

The central cloud server 102 includes suitable logic, circuitry, and interfaces that may be configured to communicate with the plurality of edge devices 104, the one or more UEs 106, and the plurality of base stations 108. In an example, the central cloud server 102 may be a remote management server that is managed by a third party different from the service providers associated with the plurality of different WCNs 110. In another example, the central cloud server 102 may be a remote management server or a data center that is managed by a third party, or jointly managed, or managed in coordination and association with one or more of the plurality of different WCNs 110. In an implementation, the central cloud server 102 may be a master cloud server or a master machine that is a part of a data center that controls an array of other cloud servers communicatively coupled to it for load balancing, running customized applications, and efficient data management.

Each edge device of the plurality of edge devices 104 includes suitable logic, circuitry, and interfaces that may be configured to communicate with the central cloud server 102. Each edge device of the plurality of edge devices 104, such as the edge device 104A, may be one of an XG-enabled edge communication device, an XG-enabled edge repeater device, an XG-enabled relay device, an XG-enabled customer premise equipment (CPE), an XG-enabled small cell, an XG-enabled road side unit (RSU), or an XG-enabled user equipment (UE) controlled by the central cloud server 102, where the term "XG" refers to 5G or 6G communication. In an example, the edge device 104A may be controlled out-of-band, for example, in a management plane, by the central cloud server 102. In an implementation, some of the edge devices of the plurality of edge devices 104 may be deployed at a fixed location while some may be portable. For example, an edge device may be a fixed wireless access (FWA) device, a repeater device, a small cell, or a CPE. In another example, some edge devices, such as an edge repeater device, may be installed in a vehicle, and thus the location of such edge repeater device may vary rapidly when the vehicle is in motion. Moreover, some edge devices may be portable, and thus their location may change. In some implementations, an edge device may be a part of a telematics unit of a vehicle or implemented as a portable repeater device.

Each of one or more UEs 106, such as a first UE 106A and a second UE 106B, may correspond to a telecommunication hardware used by an end-user to communicate. Alternatively stated, each of the one or more UEs 106 may refer to a combination of a mobile equipment and subscriber identity module (SIM). Each of the one or more UEs 106 may be a subscriber of at least one of the plurality of different WCNs 110. Examples of the one or more UEs 106 may include, but are not limited to, a smartphone, a vehicle, a virtual reality headset, an augment reality device, an in-vehicle device, a wireless modem, a customer-premises equipment (CPE), a home router, a cable or satellite television set-top box, a VoIP station, or any other customized hardware for telecommunication.

Each of the plurality of base stations 108 may be a fixed point of communication that may communicate information, in the form of a plurality of beams of RF signals, to and from communication devices, such as the one or more UEs 106 and the plurality of edge devices 104. Multiple base stations corresponding to one service provider may be geographically positioned to cover specific geographical areas. Typically, bandwidth requirements serve as a guideline for a location of a base station based on a relative distance between the plurality of UEs and the base station. The count of base stations depends on population density and geographic irregularities, such as buildings and mountain ranges, which may interfere with the plurality of beams of RF signals. In an implementation, each of the plurality of base stations 108 may be a gNB. In another implementation, the plurality of base stations 108 may include eNBs, Master eNBs (MeNBs) (for non-standalone mode), and gNBs.

Each of the plurality of different WCNs 110 is owned, managed, or associated with a mobile network operator (MNO), also referred to as a mobile carrier, a cellular company, or a wireless service provider that provides services, such as voice, SMS, MMS, Web access, data services, and the like, to its subscribers, over a licensed radio spectrum. Each of the plurality of different WCNs 110 may own or control elements of network infrastructure to provide services to its subscribers over the licensed spectrum, for example, 4G LTE or 5G spectrum (FR1 or FR2). For example, the first base station 108A or the first UE 106A may be controlled, managed, or associated with the first WCN 110A, and the second base station 108B or the second UE 106B may be controlled, managed, or associated with the second WCN 110B different from the first WCN 110A. The plurality of different WCNs 110 may also include mobile virtual network operators (MVNO).

Beneficially, the central cloud server 102 and the plurality of edge devices 104 exhibit a decentralized model that not only brings cloud computing capabilities closer to UEs in order to reduce latency but also manifests several known benefits for various service providers associated with the plurality of different WCNs 110. For example, backhaul traffic is reduced by provisioning content at the edge, computational resources are distributed geographically in different locations (e.g., on premise mini cloud, central offices, customer premises, etc.,) depending on the use case requirements and reliability of a network is improved by distributing content between edge devices and the centralized cloud server 102. Apart from these and other known benefits (or inherent properties) of edge computing, the central cloud server 102 improves and solves many open issues related to the convergence of edge computing and modern wireless networks, such as 5G or upcoming 6G. The central cloud server 102 significantly improves the beam management mechanism of 5G new radio (NR), true 5G, and creates a platform for upcoming 6G communications, to achieve low latency and high data rate requirements. Based on the various information acquired from the plurality of edge devices 104 over a period of time, the central cloud server 102 creates a connectivity enhanced database that specifies a plurality of specific uplink and downlink wireless connectivity beam alignment-wireless connectivity relationships for a surrounding area of each of the plurality of edge devices 104 independent of the plurality of different WCNs 110. This removes the complexity and substantially reduces the initial access latency as the standard beam sweeping operation in the initial access phase is bypassed and is not required to be performed at the end-user device or edge devices, which in turn improves network performance of all associated WCNs of the plurality of different WCNs 110. The central cloud server 102 is able to handle heterogeneity in wireless communication in terms of different interfaces, radio access technologies (3G, 4G, 5G, or upcoming 6G), computing technologies (e.g., hardware and operating systems) and even one or more carrier networks used by the one or more UEs 106. Moreover, the central cloud server 102 takes into account the dynamic nature of surroundings by use of the sensing information obtained from the plurality of edge devices 104 in real-time or near real time, to proactively avoid any adverse impact on reliability due to any sudden signal blockage or signal loss, thereby provisioning consistent high-speed low latency wireless connectivity. Thus, the central cloud server 102 manifest higher Quality of experience (QoE) as compared to existing systems.

Figure 2A:
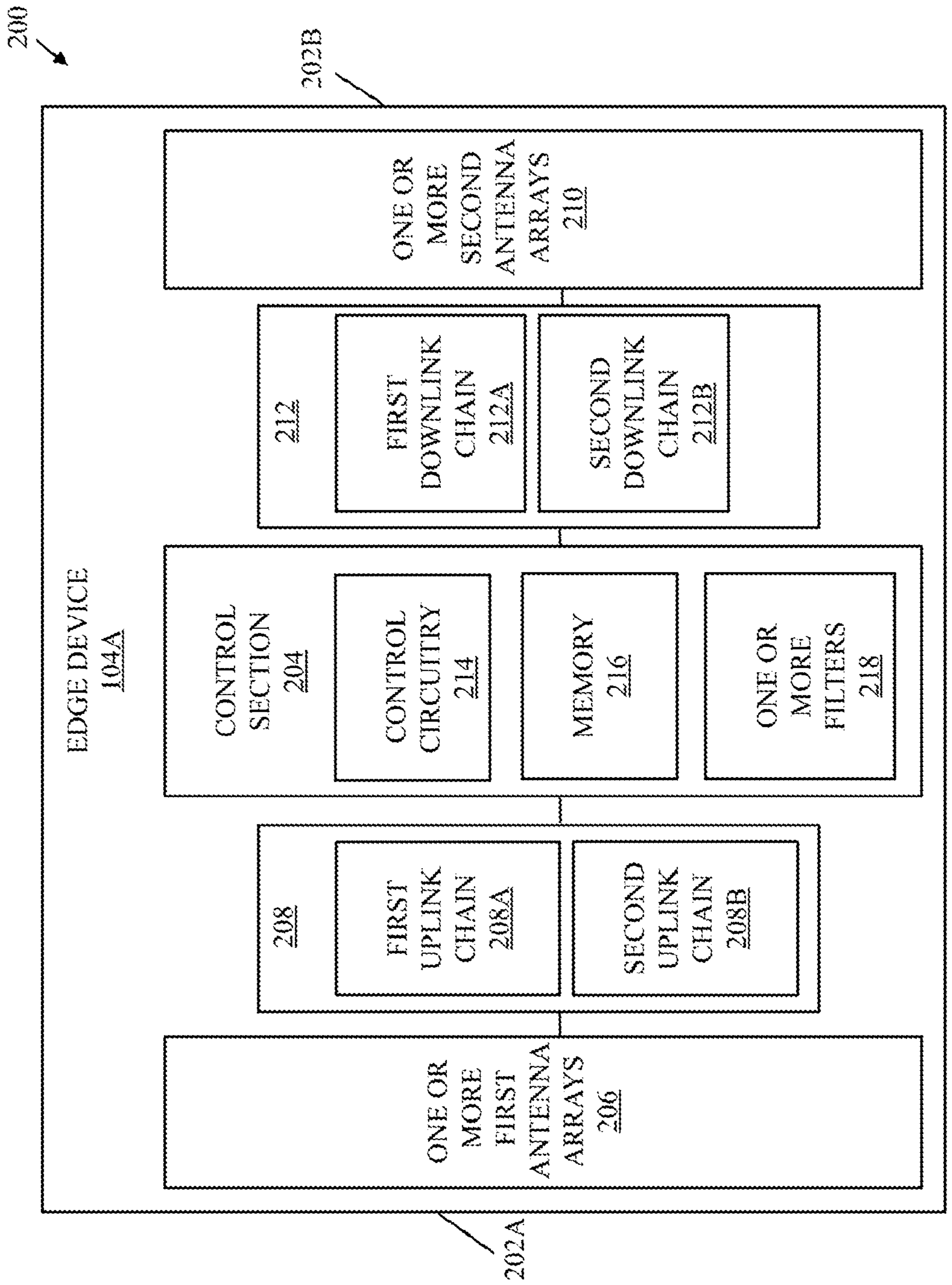
FIG. 2A is a block diagram illustrating different components of an exemplary edge device, in accordance with an embodiment of the disclosure.

FIG. 2A is a block diagram illustrating different components of an exemplary edge device, in accordance with an embodiment of the disclosure. FIG. 2A is explained in conjunction with elements from FIG. 1. With reference to FIG. 2A, there is shown a block diagram 200 of the edge device 104A with various components. The edge device 104A has a donor side 202A facing towards the plurality of base stations 108, such as the first base station 108A and the second base station 108B (of FIG. 1). The edge device 104A also has a service side 202B facing towards a plurality of UEs, such as the first UE 106A and the second UE 106B. In an implementation, the edge device 104A may include a control section 204 and a front-end radio frequency (RF) section, which may include one or more first antenna arrays 206 and a first plurality of signal processing chains 208 (such as a first uplink chain 208A and a second uplink chain 208B) at the donor side 202A, and further one or more second antenna arrays 210 and a second plurality of signal processing chains 212 (such as a first downlink chain 212A and a second downlink chain 212B) at the service side 202B. The control section 204 may be communicatively coupled to the front-end RF section, such as the one or more first antenna arrays 206, the first plurality of signal processing chains 208, the one or more second antenna arrays 210, and the second plurality of signal processing chains 212. The front-end RF section supports millimeter wave (mmWave) communication as well communication at a sub 6 gigahertz (GHz) frequency. The control section 204 may further include control circuitry 214, a memory 216, and one or more filters 218.

The edge device 104A includes suitable logic, circuitry, and interfaces that may be configured to communicate with one or more network nodes, such as one or more base stations of the plurality of base stations 108, another edge devices of the plurality of edge devices 104, and user equipment (UEs). In accordance with an embodiment, the edge device 104A may support multiple and a wide range of frequency spectrum, for example, 2G, 3G, 4G, 5G, and 6G (including out-of-band frequencies). The edge device 104A may be one of an XG-enabled edge communication device, an XG-enabled edge repeater device, an XG-enabled relay device, an XG-enabled customer premise equipment (CPE), an XG-enabled small cell, or an XG-enabled user equipment (UE) controlled by the central cloud server 102, where the term “XG” refers to 5G or 6G communication. Other examples of the edge device 104A may include, but is not limited to, a 5G wireless access point, an evolved-universal terrestrial radio access-new radio (NR) dual connectivity (EN-DC) device, a Multiple-input and multiple-output (MIMO)-capable repeater device, or a combination thereof.

The one or more first antenna arrays 206 may be provided at the donor side 202A and may be communicatively coupled to the first plurality of signal processing chains 208, such as the first uplink chain 208A and the second uplink chain 208B. The one or more second antenna arrays 210 may be provided at the service side 202B and may be communicatively coupled to the second plurality of signal processing chains 212, such as the first downlink chain 212A and the second downlink chain 212B. Each of the first plurality of signal processing chains 208, such as the first uplink chain 208A and the second uplink chain 208B, may include a transceiver chain. The control circuitry 214 may be further configured to receive a first donor beam from the first base station 108A and a second donor beam from the second base station 108B using the one or more first antenna arrays 206. In an example, each of the first plurality of signal processing chains 208, such as the first uplink chain 208A and the second uplink chain 208B, and each of the second plurality of signal processing chains 212, such as the first downlink chain 212A and the second downlink chain 212B, may include a cascading receiver chain and a cascading transmitter chain, each of which comprises various components for baseband signal processing or digital signal processing. For example, the cascading receiver chain may include various components, such as a set of low noise amplifiers (LNA), a set of receiver front end phase shifters, and a set of power combiners, for the signal reception (not shown here for brevity). Similarly, the cascading transmitter chain comprises various components for baseband signal processing or digital signal processing, such as a set of power dividers, a set of phase shifters, a set of power amplifiers (PA). The control circuitry 214 maybe further configured to direct a first beam of RF signal in the first WCN 110A to the first UE 106A and a second beam of RF signal in the second WCN 110B to the second UE 106B using the one or more second antenna arrays 210 provided at the service side 202B.

In an implementation, the one or more first antenna arrays 206 and the one or more second antenna arrays 210 supports multiple-input multiple-output (MIMO) operations and may be configured to execute MIMO communication with a plurality of UEs, such as the first UE 106A and the second UE 106B. The MIMO communication may be executed at a sub 6 gigahertz (GHz) frequency or at mmWave frequency for 5G NR communication. Each of the one or more first antenna arrays 114 and the one or more second antenna arrays 116 may be one of an XG phased-array antenna panel, an XG-enabled antenna chipset, an XG-enabled patch antenna array, or an XG-enabled servo-driven antenna array, where the "XG" refers to 5G or 6G. Examples of implementations of the XG phased-array antenna panel include, but is not limited to, a linear phased array antenna, a planar phased array antenna, a frequency scanning phased array antenna, a dynamic phased array antenna, and a passive phased array antenna.

The control circuitry 214 may be communicatively coupled to the memory 216, the one or more filters 218, and the front-end RF section. The control circuitry 214 may be configured to execute various operations of the edge device 104A. The control circuitry 214 may be configured to control various components of the front-end RF section, such as the one or more first antenna arrays 206 and the first plurality of signal processing chains 208 at the donor side 202A; and the one or more second antenna arrays 210 and the second plurality of signal processing chains 212 at the service side 202B. The edge device 104A may be a programmable device, where the control circuitry 214 may execute instructions stored in the memory 216. An exemplary implementation of the control circuitry 214 may include, but are not limited to an embedded processor, a baseband processor, a microcontroller, a specialized digital signal processor (DSP), a control chip, a Reduced Instruction Set Computing (RISC) processor, an Application-Specific Integrated Circuit (ASIC) processor, a Complex Instruction Set Computing (CISC) processor, and/or other processors, or state machines.

The memory 216 may be configured store wireless connectivity enhanced information for a plurality of UEs, such as the first UE 106A and the second UE 106B, obtained from the central cloud server 102. The memory 216 may be further configured store values calculated by the control circuitry 214. Examples of the implementation of the memory 216 may include, but not limited to, a random access memory (RAM), a dynamic random access memory (DRAM), a static random access memory (SRAM), a processor cache, a thyristor random access memory (T-RAM), a zero-capacitor random access memory (Z-RAM), a read only memory (ROM), a hard disk drive (HDD), a secure digital (SD) card, a flash drive, cache memory, and/or other non-volatile memory. It is to be understood by a person having ordinary skill in the art that the control section 204 may further include one or more other components, such as an analog to digital converter (ADC), a digital to analog (DAC) converter, a cellular modem, and the like, known in the art, which are omitted for brevity.

The one or more filters 218 may be a band-pass filter, a multi-band filter or other channel select filter. The one or more filters 218 may be used to allow or reject one or more bandwidth parts (BWPs) of one or more NR frequency bands in an uplink and a downlink direction using the one or more filters 218. The one or more filters 218 may also be used to segregate uplink and downlink communication of RF signals from the first WCN 110A with the second WCN 110B based on the wireless connectivity enhanced information obtained from the central cloud server 102.

Figure 2B:
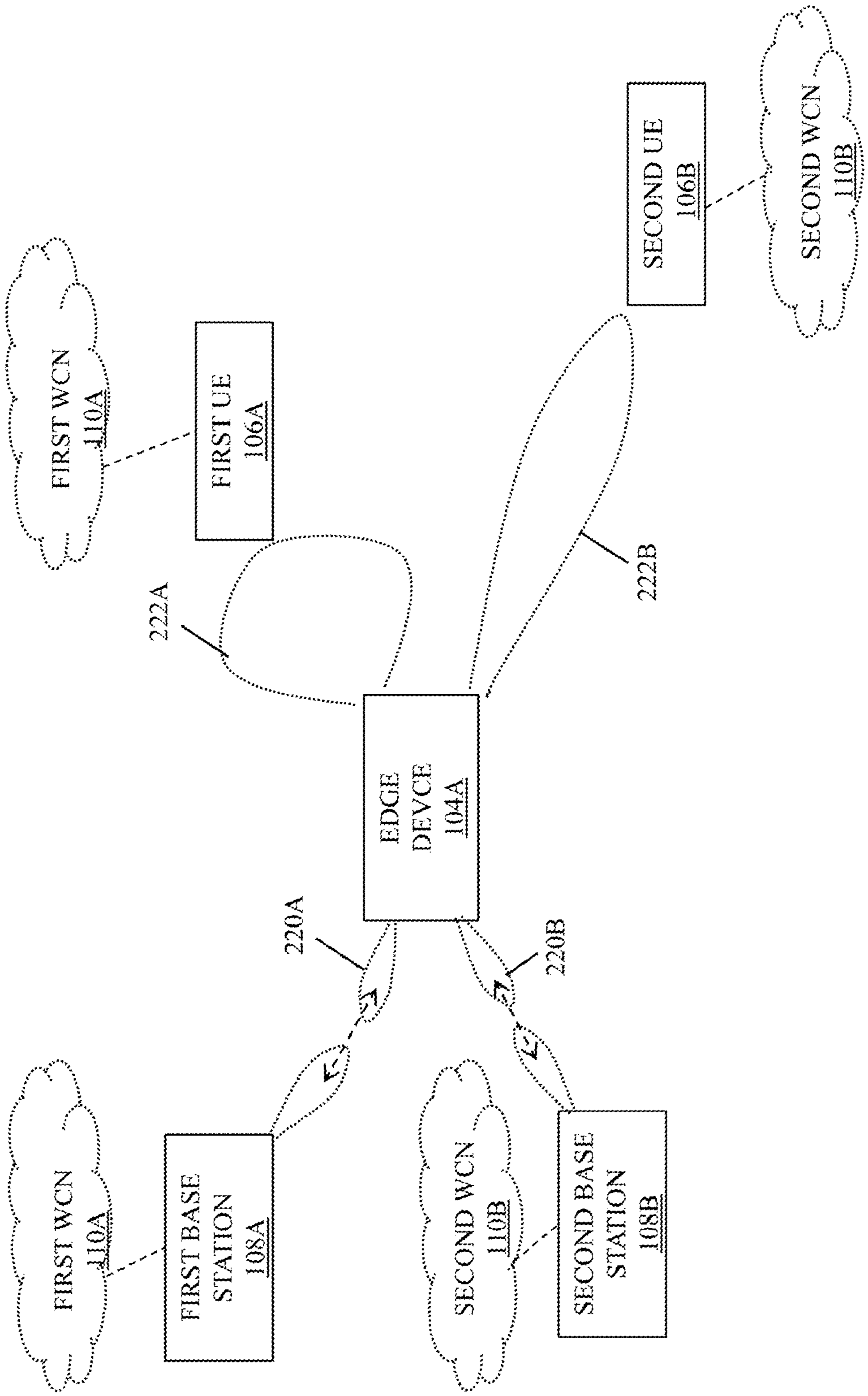
FIG. 2B is a network environment diagram of an edge device for handling service for multiple service providers for high performance and reliable communication, in accordance with an embodiment of the disclosure.

FIG. 2B is a network environment diagram of an edge device for handling service for multiple service providers for high performance and reliable communication, in accordance with an embodiment of the disclosure. FIG. 2B is explained in conjunction with elements from FIGS. 1 and 2A. With reference to FIG. 2B, there is shown the edge device 104A that may be independent of the plurality of different WCNs 110 and can handle services for multiple service providers. There is further shown the first base station 108A of the first WCN 110A of a first service provider and the second base station 108B of the second WCN 110B of a second service provider different from the first service provider.

In operation, the control circuitry 214 may be configured to receive a first connection request from the first UE 106A associated with the first WCN 110A of a first service provider. The first UE 106A may be subscribed to the first WCN 110A of the first service provider. In an example, the connection request may be received via an out-of-band communication, such as WI-FI™, BLUETOOTH™, Li-Fi, a sidelink request (e.g., LTE sidelink, 5G New Radio (NR) sidelink, NR C-V2X sidelink), a vehicle-to-infrastructure (V2I) request, a personal area network (PAN) connection, or other out-of-band connection requests. Similarly, the control circuitry 214 may be further configured to receive a second connection request from the second UE 106B associated with the second WCN 110B of a second service provider. The second UE 106B may be subscribed to the second WCN 110B of the second service provider.

In accordance with an embodiment, the control circuitry 214 may be further configured to activate the edge device 104A and establish a connection with each of the first UE 106A and the second UE 106B based on the corresponding connection request. In an implementation, the control circuitry 214 may be further configured to obtain a corresponding activation signal from each of the first UE 106A and the second UE 106B, where the corresponding activation signal is generated at the first UE 106A and the second UE 106B using at least one of an application installed in the first UE 106A and the second UE 106B, an authentication key, or a registered gesture. In an example, the first UE 106A or the second UE 106B may be a smartphone or other UE that may have the application installed in it, where the application may be communicatively coupled to the central cloud server 102. In another example, the first UE 106A or the second UE 106B may be a vehicle, in which the application may be installed in a smartphone connected to an in-vehicle infotainment system of the vehicle or the application may be preinstalled in the vehicle (e.g., in the in-vehicle infotainment system). A unique identity, for example, in the form of the authentication key, or the registered gesture, or other identifying means may be used to identify users associated with the first UE 106A or 106B as a valid user to receive services of the central cloud server 102 and the edge device 104A. The control circuitry 214 may be further configured to activate the edge device 104A to service the first UE 106A and the second UE 106B based on an authentication of the corresponding activation signal. In an implementation, the corresponding activation signal from each of the first UE 106A and the second UE 106B may be a part of the first connection request and second connection request, respectively. In another implementation, the corresponding activation signal from each of the first UE 106A and the second UE 106B may be sent even prior to the connection request, during the connection request, or post the connection request. The control circuitry 214 may be further configured to identify the one or more UEs, such as the first UE 106A and the second UE 106B based on the connection request.

In an implementation, the first connection request from the first UE 106A and the second connection request from the second UE 106B may be automatically sent by the first UE 106A and the second UE 106B when such UEs are in the communication range of the edge device 104A. In some implementations, the communication of the first connection request from the first UE 106A and the second connection request from the second UE 106B is controlled by the central cloud server 102 based on communication of sensing information (e.g., a current position, a moving direction, a time-of-day, and surrounding information, such as the presence of reflective objects or signal blocking objects) associated with the corresponding UEs, such as the first UE 106A and the second UE 106B. The central cloud server 102 may be configured to determine that a handover is required, and accordingly send a wireless connectivity enhanced information for the first UE 106A and the second UE 106B to the edge device 104A.

The control circuitry 214 may be further configured to obtain wireless connectivity enhanced information for the first UE 106A and the second UE 106B from the central cloud server 102. In accordance with an embodiment, the control circuitry 214 may be further configured to obtain the wireless connectivity enhanced information from the central cloud server 102 based on a position of the edge device 104A. The wireless connectivity enhanced information provided by the central cloud server 102 for the first UE 106A and the second UE 106B may include selected initial access information to accelerate a UE-specific beam alignment for each of the first UE 106A and the second UE 106B and connectivity to one or more base stations, such as the first base station 108A and the second base station 108B, from the edge device 104A bypassing an initial access-search on the edge device 104A.

The selected initial access information for the first UE 106A and the second UE 106B may indicate the best and/or optimal transmit (Tx) and receive (Rx) beam for the donor side 201A and the best Tx-Rx beam for the service side 202B, best Physical Cell Identities (PCIDs) associated with different service providers, best and/or optimal absolute radio-frequency channel number (ARFCNs), and a signal strength information associated with each of Tx beam and the Rx beam of the edge device 104A. The best and/or optimal refers to wireless connectivity using multiple beams of RF signals at both the donor side 202A and service side 202B that has the highest signal strength (or among the top three available signal strengths), for example, for 5G NR signals and data throughput rate higher than one or more specified threshold values, while executing uplink and downlink communication using the plurality of different WCNs 110. In an example, the selected initial access information in the wireless connectivity enhanced information for the first UE 106A may include a first decoded Physical Cell Identity (PCID) of the first base station 108A (i.e., 5G-enabled gNB) of the first WCN 110A and a first beam index used to switch beam reception and transmission from the one or more first antenna arrays 206 at the donor side 202A of the edge device 104A to the first base station 108A. The selected initial access information obtained by the edge device 104A for the first UE 106A may further include a first absolute radio-frequency channel number (ARFCN) or other base station properties of the first base station 108A to establish a Radio Resource Control (RRC) connection, for example, in a first 5G NR carrier frequency, with the first base station 108A. Similarly, the selected initial access information in the wireless connectivity enhanced information for the second UE 106B may include a second decoded Physical Cell Identity (PCID) of the second base station 108B (i.e., another 5G-enabled gNB) of the second WCN 110B, and a second beam index used to switch beam reception and transmission from the one or more first antenna arrays 206 at the donor side 202A of the edge device 104A to the second base station 108B at the edge device 104A. The selected initial access information obtained by the edge device 104A for the second UE 106B may further include a second ARFCN or other base station properties of the second base station 108B to establish a Radio Resource Control (RRC) connection, for example, in a second 5G NR carrier frequency, with the second base station 108B. For the service side 202B to service the first UE 106A and the second UE 106B, the wireless connectivity enhanced information for the first UE 106A and the second UE 106B may further include a first service side beam index and a second service side beam index for the first UE 106A and the second UE 106B, respectively. The first service side beam index and the second service side beam index correspond to the strongest UE-specific beam predetermined for a corresponding location of the first UE 106A and the second UE 106B, respectively. Thus, the selected initial access information may be the best (or optimal) initial access information that provides initial access to the first UE 106A and the second UE 106B to the best gNBs, such as the first base station 108A and the second base station 108B. The best (or optimal) refers to wireless connectivity using multiple beams of RF signals at both the donor side 202A and service side 202B that has the highest signal strength (or among the top three available signal strengths), for example, for 5G NR signals and data throughput rate higher than a threshold, while executing uplink and downlink communication using the plurality of different WCNs 110, given the current location of the first UE 106A and the second UE 106B. Thus, the central cloud server 102 assists the edge device 104A by providing them with optimized initial access information (e.g., best beam index, best beam configuration, best ARFCN, and PCID) that it has learned the machine learning model 308 during the training phase (described in detail, for example, in FIG. 3).

In accordance with an embodiment, the control circuitry 214 may be further configured to receive a first donor beam 220A from the first base station 108A and a second donor beam 220B from the second base station 108B. The edge device 104A may be within the coverage area of each of the first base station 108A of the first WCN 110A and the second base station 108B of the second WCN 110B that may be different from the first WCN 110A. As the edge device 104A includes a plurality of signal processing chains, such as the first plurality of signal processing chains 208, at the donor side 202A, the first donor beam 220A from the first base station 108A and the second donor beam 220B from the second base station 108B may be received concurrently from two different base stations of two different service providers and processed concurrently. For example, the first uplink chain 208A may be configured to process the first donor beam 220A associated with the first WCN 110A, and the second uplink chain 208B may be configured to process the second donor beam 220B associated with the first WCN 110A, where the first donor beam 220A and the second donor beam 220B are received via the one or more first antenna arrays 206 at the donor side 202A of the edge device 104A. Thus, each signal processing chain of the first plurality of signal processing chains 208 may be associated with one WCN to segregate an uplink and a downlink communication of RF signals from the first WCN 110A with the second WCN 110B. Each of the first plurality of signal processing chains 208 at the donor side 202A and second plurality of signal processing chains 212 at the service side 202B may be controlled by the control circuitry 214.

In some implementations, the control circuitry 214 may be further configured to utilize the one or more filters 218 to maintain mutual isolation of a first data stream of the first donor beam 220A from a second data stream of the second donor beam 220B. In other words, the one or more filters 218 may also be used to segregate uplink and downlink communication of RF signals from the first WCN 110A with the second WCN 110B based on the wireless connectivity enhanced information obtained from the central cloud server 102. Alternatively, the control circuitry 214 may be further configured to receive the first donor beam 220A directly from the first base station 108A and the second donor beam 220B associated with the second base station 108B from another edge device (such as the edge device 104B) that is a part of a network of edge devices, such as the plurality of edge devices 104. For example, in certain scenarios, there may be temporary signal blockage due to a moving object that may block signals between the edge device 104A and the second base station 108B or there may be a blockage due to a non-line-of-sight (NLOS) between the second base station 108B and a particular edge device due to its position, such as the edge device 104A. In such scenarios, the other edge device that may be in a line-of-sight (LOS) between the second base station 108B and the other edge device, such as the edge device 104B, may first receive the second donor beam 220B associated with the second base station 108B and relay the second donor beam 220B to the edge device 104A. The other edge device, such as the edge device 104B, receives the second donor beam 220B for further relay to the destination edge device, such as the edge device 104A, based on an instruction from the central cloud server 102 or a request from the edge device 104A.

The control circuitry 214 may be further configured to direct a first beam 222A of radio frequency (RF) signal in the first WCN 110A to the first UE 106A and a second beam 222B of RF signal in the second WCN 110B to the second UE 106B based on the obtained connectivity enhanced information for the first UE 106A and the second UE 106B. The edge device 104A is independent of a plurality of different WCNs 110 such that any one of the plurality of different WCNs 110 is used to service a specific UE in accordance with an association of the specific UE to a specific WCN. In some implementations, the first beam of RF signal in the first WCN 110A to the first UE 106A and the second beam of RF signal in the second WCN 110B to the second UE 106B are concurrently directed from the edge device 104A. The first beam of RF signal may carry a first payload of the first data stream associated with the first WCN 110A to the first UE 106A and the second beam of RF signal carry at least one of a second payload of the second data stream associated with the second WCN 110B to the second UE 106B or a null payload associated with the second WCN 110B to the second UE 106B.

In some implementations, the first beam of RF signal in the first WCN 110A to the first UE 106A and the second beam of RF signal in the second WCN 110B to the second UE 106B are alternatingly directed from the edge device 104A (e.g., in a switching pattern). In such a case, each of the donor side 202A and the service side 202B of the edge device 104A may utilize one signal processing chain which may be configured to alternatively process RF signals from the first WCN 110A and the second WCN 110B in a switching pattern under the control of the control circuitry 214.

In some implementations, the control circuitry 214 may be further configured to receive two or more time division duplex (TDD) patterns from two or more base stations (e.g., gNBs, such as the first base station 108A and the second base station 108B) of different service providers. The control circuitry 214 may be further configured to find a common TDD pattern for the received two or more TDD patterns and follow the common TDD pattern for switching RF signals between different wireless carrier networks of the different service providers for uplink and downlink communication. The common TDD pattern allows uplink and downlink to use complete 5G NR frequency spectrum, but in different time slots, where some short time slots are designated for uplink while other time slots are designated for downlink and coordinate switching of the RF signals between the first WCN 110A and the second WCN 110B of the different service providers for uplink and downlink communication. In an implementation, the two or more TDD patterns for the two or more base stations (e.g., gNBs, such as the first base station 108A and the second base station 108B) of different service providers, may be received in the obtained wireless connectivity enhanced information from the central cloud server 102. The common TDD pattern may indicate a common timing reference to align the edge device 104A with that of a 5G NR cell frame for an uplink or a downlink time division duplex (TDD) switching for different service providers, for example, using a common phase clock reference (e.g., a coordinated universal time), and a switching-point periodicity, for example, a switching periodicity from the uplink to the downlink and for different service providers based on the common TDD pattern.

Beneficially, multiple UEs, such as the first UE 106A and the second UE 106B, associated with different service providers is serviced by a single edge device, such as the edge device 104A (e.g., a repeater device or an RSU). Alternatively stated, a single edge device can service multiple UEs associated with different service providers, thereby reducing (i.e., optimizing) the total number of network nodes for each service provider required to be deployed or used to service the same number of UEs in one or more geographical areas. Furthermore, the edge device 104A ensures seamless connectivity as well as QoE while reducing the infrastructure cost by greater than 50 percent considering just two different service providers, such as the first WCN 110A and the second WCN 110B. The edge device 104A seamlessly handles heterogeneity and supports the plurality of different WCNs 110 for high performance and reliable communication. Furthermore, a consumer, such as the first UE 106A, is provided to choose which WCN (i.e., which service provider) they like to connect to, and this is enabled from the cloud, such as the central cloud server 102. The central cloud server 102 transmits specific initial access information (optimal initial access information) associated with one or more WCNs, such as the first WCN 110A and the second WCN 110B, to the edge device 104A, where such specific initial access information is used by the edge device 104A to establish wireless connectivity by passing conventional initial-access search. Hence, beneficially, a consumer of a UE, such as the first UE 106A, subscribed to the first WCN 110A can request the edge device 104A in the connection request to relay an RF signal of the first WCN 110A, and if the consumer of the first UE 106A is subscribed to the second WCN 110B, then the first UE 106A can request the edge device 104A, to relay an RF signal of the second WCN 110B. Additionally, and advantageously, as the obtained connectivity enhanced information for the first UE 106A and the second UE 106B is independent of the plurality of different WCNs 110, the complexity and the initial access latency is significantly reduced as the standard beam sweeping operation in the initial access phase is bypassed and is not required to be performed at the first UE 106A and the second UE 106B and the edge device 104A, which in turn improves network performance and reduces additional signaling load (due to standard initial-access search) on associated WCNs of the plurality of different WCNs 110.

In accordance with an embodiment, the control circuitry 214 is further configured to utilize the obtained connectivity enhanced information to, for example: reduce time to align to a timing offset of a beam reception at the edge device 104A to a frame structure of a 5G NR radio frame, and allow uplink and downlink to use complete 5G NR frequency spectrum for different service providers; set beam index or set phase values of the received RF signals to design beams to service the first UE 106A and the second UE 106B in real time or near real time; set parameters, e.g., amplifier gains, and phase responses associated with the one or more first antenna arrays 206 or the one or more second antenna arrays 210; form specific beam patterns from the edge device 104A specific to the first UE 106A and the second UE 106B; execute dynamic partitioning of a plurality of antenna elements of an antenna array of the one or more second antenna arrays 210 at the service side 202B into a plurality of spatially separated antenna sub-arrays to generate multiple beams associated with different WCNs in different directions at the same time or in a different time slot; set a suitable adjustment of a power back-off to minimize (i.e., substantially reduce) the impact of interference (echo or noise signals) and hence only use as much power as needed to achieve low error communication with the first base station 108A and the second base station 108B in the uplink or the first UE 106A and the second UE 106B in the downlink communication; and optimize blocks of radio and perform Radio access network optimization to improve coverage, capacity and service quality of a geographical area surrounding the edge device 104A.

Figure 3:
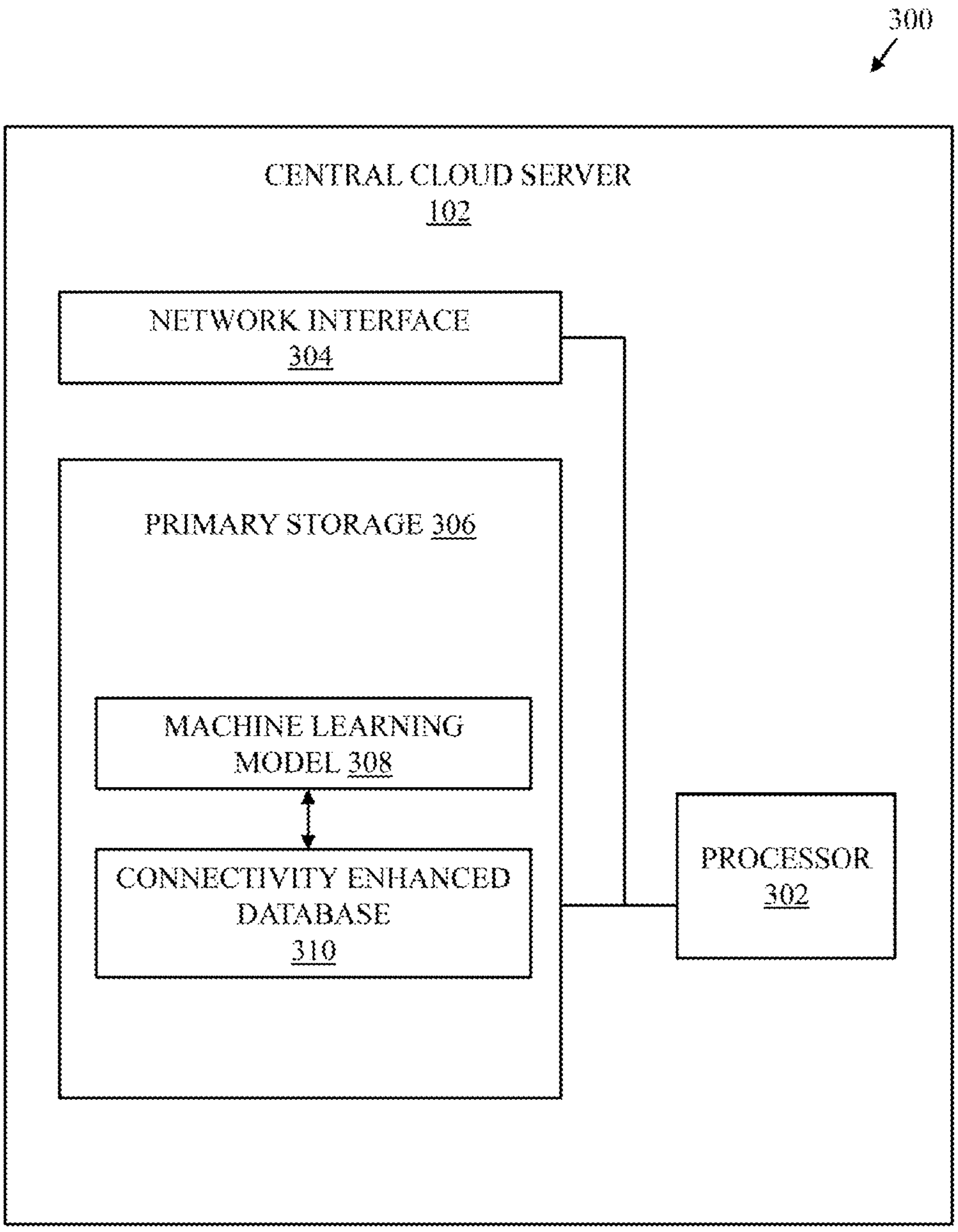
FIG. 3 is a block diagram illustrating different components of an exemplary central cloud server, in accordance with an embodiment of the disclosure.

FIG. 3 is a block diagram illustrating different components of an exemplary central cloud server, in accordance with an embodiment of the disclosure. FIG. 3 is explained in conjunction with elements from FIGS. 1, 2A, and 2B. With reference to FIG. 3, there is shown a block diagram 300 of the central cloud server 102. The central cloud server 102 may include a processor 302, a network interface 304, and a primary storage 306 (e.g., a datacenter, a memory, cloud storage, etc.). The primary storage 306 may further include sensing information and beam alignment information. In an implementation, the primary storage 306 may further include processing chain parameters. There is further shown a machine learning model 308 and a connectivity enhanced database 310.

In operation, in accordance with an embodiment, the processor 302 may be configured to obtain the sensing information of the surrounding area of the edge device 104A. The sensing information may be periodically or continually obtained from the edge device 104A. The processor 302 may be further configured to communicate wireless connectivity enhanced information to the edge device 104A for the first UE 106A and the second UE 106B. The communication may be executed based on the corresponding request from the first UE 106A and the second UE 106B and the position of the edge device 104A. In some implementations, the communication may be executed based on the obtained sensing information. For example, the processor 302 may be further configured to determine, based on the position information of the edge device 104A, whether the handover is required, and if so, communicate the wireless connectivity enhanced information including, the specific initial access information to the edge device 104A to bypass the initial access-search on the edge device 104A. The wireless connectivity enhanced information, including the specific initial access information to the edge device 104A, is extracted from the connectivity enhanced database 310. The connectivity enhanced database 310 may be a low-latency database, for example, "DynamoDB", "Scylla", or other proven and known low-latency databases that can handle one or more million transactions per second on a single cloud server. The connectivity enhanced database 310 may be an intelligent and learned database that is generated based on the training of the machine learning model 308 previously (explained in detail later in FIG. 3, for example, under "the training phase"), which specifies a plurality of specific uplink and downlink wireless connectivity enhanced information for a surrounding area of each of the plurality of edge devices 104 independent of a plurality of different WCN 110 of different service providers.

In accordance with an embodiment, the processor 302 may be further configured to control the edge device 104A to concurrently direct the first beam of RF signal in the first WCN 110A to the first UE 106A and the second beam of RF signal in the second WCN 110B to the second UE 106B in accordance with the wireless connectivity enhanced information for the first UE 106A and the second UE 106B bypassing an initial access-search on the edge device 104A. Alternatively, the processor 302 may be further configured to control the edge device 104A to alternatingly direct the first beam of RF signal in the first WCN 110A to the first UE 106A and the second beam of RF signal in the second WCN 110B to the second UE 106B in accordance with the wireless connectivity enhanced information for the first UE 106A and the second UE 106B bypassing an initial access-search on the edge device 104A.

The Training Phase:

The connectivity enhanced database 310 may be generated based on the training of the machine learning model 308 in the training phase. In an exemplary training phase, the processor 302 may be configured to periodically obtain sensing information from the plurality of edge devices 104. Each of the plurality of edge devices 104 may be deployed at different locations. The machine learning model 308 of the central cloud server 102 may be periodically (e.g., daily and for different times-of-day) trained on data points that are uploaded to the central cloud server 102 from the plurality of edge devices 104. In an example, the sensing information may comprise a position of each of the plurality of edge devices 104, a location of the one or more UEs 106 in the motion state or in the stationary state in the surrounding area of each of the plurality of edge devices 104, a moving direction of different UEs (such as the one or more UEs 106), a time-of-day, traffic information, road information, construction information, and traffic light information. The central cloud server 102 obtains such sensing information and stores the data points of such sensing information as input features. As the sensing information is obtained periodically from various edge devices of the plurality of edge devices 104, all changes in the surroundings of each edge device are adequately captured and relayed to the central cloud server 102.

In some implementations, each edge device of the plurality of edge devices 104 may be configured to utilize external sensing devices, such as Lidar, camera, accelerometer, Global Navigation Satellite System (GNSS), gyroscope, or Internet-of-Things (IoT) devices (e.g., video surveillance devices, roadside sensor systems for measuring speed, local road conditions, local traffic, and the like) located within its communication range to acquire sensing information from such external devices. For example, an edge device may be an edge repeater device mounted on a vehicle and communicatively coupled to different in-vehicle sensors via an in-vehicle network, so as to acquire the sensing information from such in-vehicle sensors (i.e., the external sensors) in real time or near time.

In accordance with an embodiment, the sensing information may further comprise a distance of each of the plurality of edge devices 104 from the one or more UEs 106 and other movable and immobile physical structures in the surrounding area of each of the plurality of edge devices 104. In an implementation, the distance of each of the plurality of edge devices 104 from one or more UEs within its range, such as the one or more UEs 106, and other movable and immobile physical structures in the surrounding area of each of the plurality of edge devices 104, may be determined at each of the plurality of edge devices 104 or at least some edge devices of the plurality of edge devices 104, and then communicated to the central cloud server 102 as the sensing information. In some implementations, the central cloud server 102 may be configured to determine such distance based on the position information received from the plurality of edge devices 104.

In an example, the processor 302 may be further configured to determine a distance of each edge device (e.g., an edge repeater device) from its surrounding objects, such as other vehicles, buildings, or edges of a building, distance of one or more serving base stations of the plurality of base stations, trees, and other immobile physical structures (such as reflective objects) or other mobile objects. Moreover, Lidar information from vehicles, information from a navigation system (such as maps, for example, identifying cross-sections of streets), satellite imagery of buildings of a surrounding area, bridges, any signal obstruction from a change in construction structure, etc., may be stored in the cloud, such as the central cloud server 102.

The machine learning model 308 of the central cloud server 102 may be periodically (e.g., daily and for different times of day) updated on such data points in real-time or near time. The central cloud server 102 may be further configured to cause the machine learning model 308 to find correlation among such data points to be used for a plurality of predictions and formulate rules to establish, maintain, and select one or more edge devices in advance for various traffic scenarios to serve UEs and to identify improved (e.g., optimal) signal transmission paths to reach to UEs and for efficient handover for wireless connectivity at a later stage (i.e., in the inference phase). Based on the sensing information obtained from the plurality of edge devices 104, the processor 302 may be further configured to detect where reflective objects are located and used that information in radiation pattern of the RF signals, such as 5G signals. The sensing information may configure the radiation pattern so that it is correlated to areas such that reflection of the communicated RF signals is mitigated or eliminated. This means that when one or more beams of RF signals are communicated from the plurality of edge devices 104, comparatively significantly lower or almost negligible RF signals are reflected back to the plurality of edge devices 104. The location of the reflective objects and the correlation of the areas associated with reflective objects with the radiation pattern to design enhanced or most suited beam configurations may be further used by the processor 302 to formulate rules for later use.

In accordance with an embodiment, the sensing information may further comprise weather information. It is known that more attention is provided in the region between 30-300 GHz frequencies due to the large bandwidth which is available in this region to enable the plurality of different WCNs 110 to cope with the increasing demand for higher data rates and ultra-low latency services. However, the signals at frequencies above 30 GHz may not propagate for long distances as those below 30 GHz. Moreover, there is signal attenuation due to weather factors, such as humidity, rain, ice, different types of storms, and even there is a difference observed during summer and winter on the signal power level. For example, the signal loss difference between winter and summer for 28 GHz may be about 1 dB, about 2 dB for 37 GHZ, about 4 dB for 60 GHz. The losses may increase with frequency and distance. The processor 302 utilizes such weather information to determine one or more changes in a performance state of each of the plurality of edge devices 104 in servicing the one or more UEs 106 in its surrounding area in different weather conditions and accordingly may learn a correlation between different weather condition and signal power level and other performance states of each of the plurality of edge devices 104 in servicing the one or more UEs 106 in its surrounding area. Accordingly, the processor 202 may be further configured to formulate rules to establish, maintain, and select one or more edge devices in advance to mitigate signal losses in various weather conditions to serve UEs and to identify improved signal transmission paths to reach to UEs via one or more edge devices of the plurality of edge devices 104 at a later stage (i.e., in the inference phase). For example, the processor 302 may be further configured to cause the one or more edge devices to select a most appropriate beam configuration or radiation pattern in real time or near real time in accordance with the weather condition obtained as a part of the sensing information (i.e., in the inference phase).

The processor 302 may be further configured to periodically obtain beam alignment information from the plurality of edge devices 104. The beam alignment information may be obtained and stored for the plurality of different WCNs 110. In an implementation, the beam alignment information received by the central cloud server 102 from the plurality of edge devices 104 during the training phase may comprise one or more of a transmit (Tx) beam information, a receive (Rx) beam information, a Physical Cell Identity (PCID), and an absolute radio-frequency channel number (ARFCN), and a signal strength information associated with each of Tx beam and the Rx beam of the plurality of edge devices 104.

The processor 302 may be further configured to correlate the obtained sensing information and the beam alignment information for different times-of-day such that the connectivity enhanced database 310 is generated that specifies a plurality of time-of-day specific uplink and downlink beam alignment-wireless connectivity relationships for a surrounding area of each of the plurality of edge devices 104 independent of the plurality of different WCNs 110. The correlation indicates that for a given set of input features extracted from the sensing information, what is the most suitable (i.e., best) initial access information for a given edge device according to its position to service one or more UEs in its surrounding area such that a high-speed and low latency wireless connectivity can be achieved with increased consistency for different times-of-day.

The time-of day specific uplink beam-alignment-wireless connectivity relation specifies, for the given set of input features for a given time-of-day, which beam index to set at an edge device for the uplink communication, a specific Physical Cell Identity (PCID) which indicates which gNB to connect to, or which WCN to select, which specific beam configuration to set, or whether a connection to the base station is to be established directly or indirectly in a NLOS path using another edge device (e.g., another edge device) in a network of edge devices depending on the current location of the edge device. Similarly, the time-of day specific downlink beam-alignment-wireless connectivity relation specifies, for the given set of input features for a given time-of-day, which beam index to set at an edge device for the downlink communication, which WCN to select, which specific beam configuration to set, what power level of the RF signal may be sufficient, or an expected time period to service one or more UEs, such as the first UE 106A, depending on the current location of the edge device. In an implementation, the processor 302 may be further configured to extract and tag parameters of the beam alignment information as learning labels. The obtained sensing information may be considered as input features, whereas the beam alignment information may be considered as learning labels for the correlation. The processor 302 may be further configured to execute a mapping of the learning labels with one or more features of the obtained sensing information until the plurality of time-of-day specific uplink and downlink beam alignment-wireless connectivity relationships is established for the surrounding area of each of the plurality of edge devices 104. In an implementation, a machine learning algorithm, for example, an artificial neural network algorithm, may be used at the beginning before training with the real-world training data of input features and parameters of the beam alignment information as supervised learning labels. When the machine learning algorithm is passed through the training data of correlated input features and parameters of the beam alignment information, the machine learning algorithm determines patterns such that the input features (e.g., a distance of edge device with a UE, weather condition, a UE location, moving direction, time-of-day, etc.) are mapped to the learning labels (e.g., best initial access information, such as best PCID, best beam index to be used, signal strength measurement of a Tx/Rx beam, beam configuration, best transmission path, an absolute radio-frequency channel number (ARFCN), etc.). Since the machine learning model 308 is trained periodically, so if the base station (e.g., a gNB) configuration is changed (e.g., a new sector or gNB is added or the PCID, ARFCN is changed), the machine learning model 308 quickly adapts to the change. The processor 302 is further configured to cause the machine learning model 308 to assign more weight to recent data points using, for example, an exponential time decay process. The machine learning model 308 may be a learned model generated as output in the training process, and thus, over a period of time, the machine learning model 308 is able to predict the specific initial access information most suited for a given set of input features. Alternatively, in another implementation, a convolutional neural network (CNN) may be used for deep learning, where the input features of the sensing information and their relationship with the desired output values may be derived automatically. Thus, at the end of the training phase, the connectivity enhanced database 310 is generated that specifies the plurality of time-of-day specific uplink and downlink beam alignment-wireless connectivity relationships for the surrounding area of each of the plurality of edge devices 104 independent of the plurality of different WCNs 110.

Alternatively, in some implementations, the processor 302 may be further configured to obtain processing chain parameters from the plurality of edge devices 104. In an implementation, the processing chain parameters may be additional parameters treated as learning labels (e.g., supervised learning labels or unsupervised output values) in addition to the beam alignment information. In another implementation, for processing purposes, the processing chain parameters may be treated and processed similar to that of the beam alignment information. The processing chain parameters may be obtained for further exhaustive training and inference of the machine learning model 308.

The processing chain parameters includes information associated with elements of the first plurality of signal processing chains 208 and the second plurality of signal processing chains 212 (which includes one or more cascaded receiver chains and one or more cascaded transmitter chains) of each edge device, radio blocks information, and modem information of the plurality of edge devices 104. The central cloud server 102 may be configured such that it has access to certain defined elements or all elements of the first plurality of signal processing chains 208 and the second plurality of signal processing chains 212. The central cloud server 102 may be configured to securely access, monitor, and configure the information associated with such elements of the first plurality of signal processing chains 208 and the second plurality of signal processing chains 212 of each edge device to optimize each radio blocks and overall radio frequency signals, such as 5G signals. In an example, the central cloud server 102 may be further configured to access a Serial Peripheral Interface (SPI) between a modem and the radio (e.g., the front-end RF section) of each of the plurality of edge devices 104. The SPI may be a full-duplex bus interface used to send data between the control section 204 (e.g., a microcontroller or DSP) and other peripheral components, such as the modem, for example, a 5G modem, in an edge device. The SPI interface supports very high speeds and throughput and is suitable for handling a lot of data. In an example, the processing chain parameters may be accesses using access to the SPI.

In a first example, the central cloud server 102 may remotely access elements of the one or more signal processing chains, like the set of phase shifters, and utilize that, for example, to train the machine learning model 308, and optimize every block of an RF signal including phase (e.g., can control the phase-shifting), etc. In a second example, the central cloud server 102 may remotely access information associated with elements, such as a set of LNAs to train the machine learning model 308, and utilize that information, for example, to learn and control amplification of input RF signals received by an antenna array, such as the one or more first antenna arrays 314 or the one or more second antenna arrays 316, in order to amplify input RF signals, which may have low-power, without significantly degrading corresponding signal-to-noise (SNR) ratio in the inference phase. In a third example, the central cloud server 102 may remotely access information (e.g., phase values of the input RF signals) associated with elements, such as a set of phase shifters, to train the machine learning model 308 and control adjustment in phase values of the input RF signals, till combined signal strength value of the received input RF signals, is maximized to design beams in the inference phase. In a fourth example, the central cloud server 102 may be configured to train the machine learning model 308 with parameters (e.g., amplifier gains and phase responses) associated with the one or more first antenna arrays 314 or the one or more second antenna arrays 316, and later use learnings in the inference phase to send control signals to remotely configure or control such parameters. In a fifth example, the central cloud server 102 may be configured to access beamforming coefficients from elements of the one or more signal processing chains to train the machine learning model 308 and use such learnings to configure, control, and adjust beam patterns to and from each of the plurality of edge devices 104. In a sixth example, since the central cloud server 102 has information associated with elements of one or more cascaded receiver chains and one or more cascaded transmitter chains of each edge device, the central cloud server 102 may configure dynamic partitioning of a plurality of antenna elements of an antenna array into a plurality of spatially separated antenna sub-arrays to generate multiple beams in different directions at the same time or in a different time slot. In a seventh example, since the central cloud server 102 has information associated with elements of one or more cascaded receiver chains and one or more cascaded transmitter chains of each edge device, the central cloud server 102 may configure and instruct an edge device for a suitable adjustment of a power back-off to minimize (i.e., substantially reduce) the impact of interference (echo or noise signals) and hence only use as much power as needed to achieve low error communication with one or more base stations in the uplink or the one or more UEs 106 in the downlink communication. In accordance with an embodiment, the central cloud server 102 may be further configured to configure, monitor, and provide management, monitoring, and configuration services to, various layers of each of the plurality of edge devices 104 to optimize blocks of radio and perform Radio access network optimization to improve coverage, capacity and/or service quality.

Similar to the correlation of the obtained sensing information and the beam alignment information, the processor 302 may be further configured to correlate the processing chain parameters with that of the obtained sensing information and the beam alignment information for different times-of-day such that the connectivity enhanced database 310 is updated and includes further learned information at holistic level for a plurality of different geographical areas associated with the plurality of different WCNs 110. The correlation further improves QoE and indicates that for a given set of input features extracted from the sensing information, it provides insights as to what were the processing chain parameters when there was most suitable (i.e., best) initial access information for a given edge device according to its position to service one or more UEs in its surrounding area, and hence it allows optimal management of network resources including the plurality of edge devices 104 in the inference phase.

Figure 4:
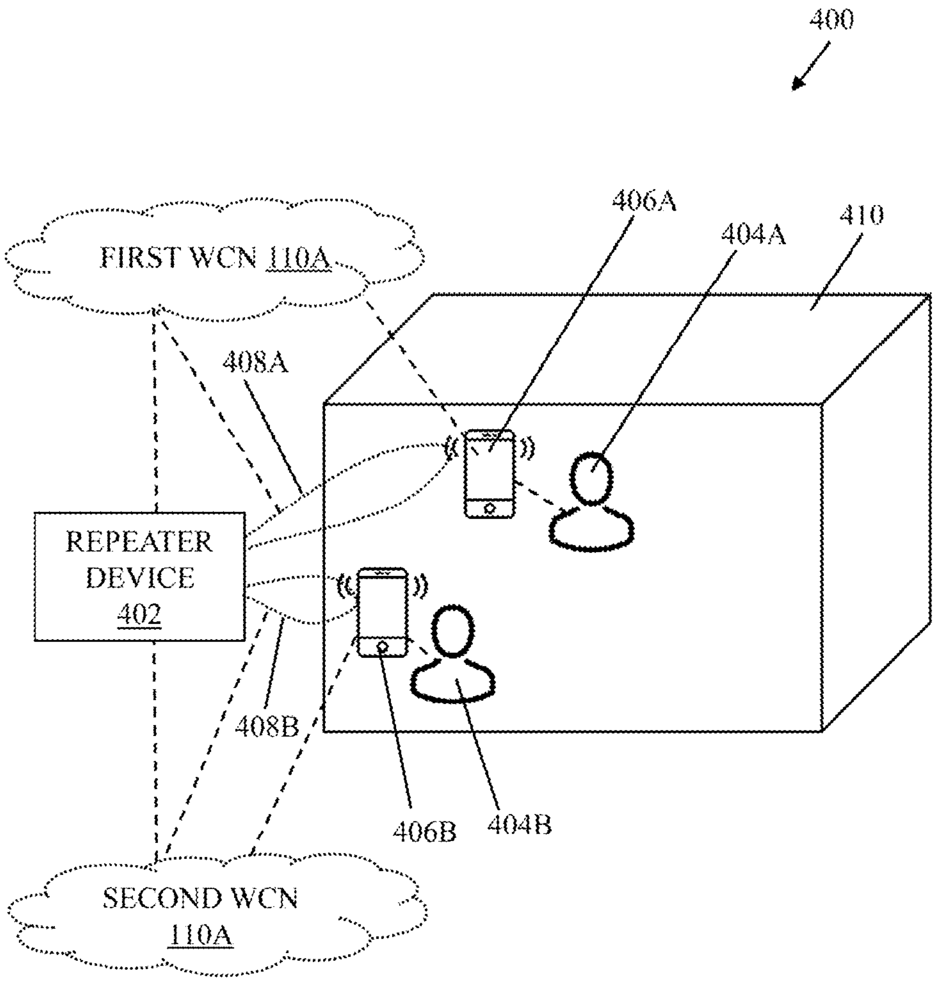
FIG. 4 is a first exemplary scenario for implementation of the edge device, the central cloud server, and the method for handling service for multiple service providers for high performance and reliable communication, in accordance with an embodiment of the disclosure.

FIG. 4 is a first exemplary scenario for implementation of the edge device, the central cloud server, and the method for handling service for multiple service providers for high performance and reliable communication, in accordance with an embodiment of the disclosure. FIG. 4 is explained in conjunction with elements from FIGS. 1, 2, and 3. With reference to FIG. 4, there is shown a first exemplary scenario 400. The first exemplary scenario 400 includes a 5G-enabled repeater device, hereinafter simply referred to as a repeater device 402, a first user 404A carrying a first smartphone 406A, and a second user 404B carrying a second smartphone 406B.

In accordance with the first exemplary scenario 400, the repeater device 402 corresponds to the edge device 104A, the first smartphone 406A corresponds to the first UE 106A and the second smartphone 406B corresponds to the second UE 106B (FIGS. 1, 2A, and 2B). The first smartphone 406A may be in a building 410 (e.g., a home, an office, or an industrial area) and may be subscribed to the first WCN 110A and serviced by a first base station (not shown) of the first WCN 110A. However, due to inadequate data throughput and signal strength from the first base of the first WCN 110A, the first user 404A may provide an input via an application interface of a preinstalled application in the first smartphone 406A to communicate a first connection request to the repeater device 402 over a Wi-Fi communication channel, in an example. The repeater device 402 may be configured to obtain a wireless connectivity enhanced information (that includes a best or optimal initial access information) for the first smartphone 406A from the central cloud server 102 in order to bypass an initial access search on the repeater device 402 and become attached to the first base station of the first WCN 110A in a first 5G NR carrier frequency. The repeater device 402 may be further configured to service the first smartphone 406A via a first beam of RF signal 408A associated with the first WCN 110A in the first 5G NR carrier frequency. Thus, the first smartphone 406A may be able to execute uplink and downlink communication in the first WCN 110A via the repeater device 402.

In the first exemplary scenario 400, the second user 404B carrying the second smartphone 406B may arrive in the building 410 but may be subscribed to the second WCN 110B, where the second smartphone 406B in the building may not receive adequate coverage or signal strength from a second base station of the second WCN 110B. The repeater device 402 may be further configured to receive a second connection request from the second smartphone 406B, associated with the second WCN 110B. The second connection request may be received based on a user-input (a gesture input, a voice input, or a touch input, or an authentication key) provided to the second smartphone 406B (detected by an application installed in the second smartphone 406B). Alternatively, the second connection request may be automatically sent based on the current location of the second smartphone 406B and its association with the second WCN 110B detected by the central cloud server 102 (or the repeater device 402). The repeater device 402 may be further configured to obtain wireless connectivity enhanced information (that includes a best or optimal initial access information) for the second smartphone 406B for its current location from the central cloud server 102. The wireless connectivity enhanced information may be received in order to bypass the initial access search on the repeater device 402 and get attached to the second base station of the second WCN 110B in a second 5G NR carrier frequency. The bypassing of the initial access search on the repeater device 402 significantly reduces signaling overhead of network by avoiding many of such standard beam management operations without any adverse impact and still maintain QoE with high reliability and consistency. The repeater device 402 may be further configured to concurrently direct the first beam of RF signal 408A in the first WCN 110A (of a first service provider) to the first smartphone 406A and a second beam of RF signal 408B in the second WCN 110B (of a second service provider) to the second smartphone 406B based on the obtained connectivity enhanced information for the first smartphone 406A and the second smartphone 406B. The first beam of RF signal 408A may carry a first payload of a first data stream associated with the first WCN 110A to the first smartphone 406A and the second beam of RF signal 408B may carry at least one of a second payload of a second data stream associated with the second WCN 110B to the second smartphone 406B or a null payload associated with the second WCN 110B to the second smartphone 406B. Advantageously, the repeater device 402 that acts as an edge device is independent of the plurality of different WCNs 110 and can handle services for multiple service providers to ensure seamless connectivity and increase QoE.

Figure 5:
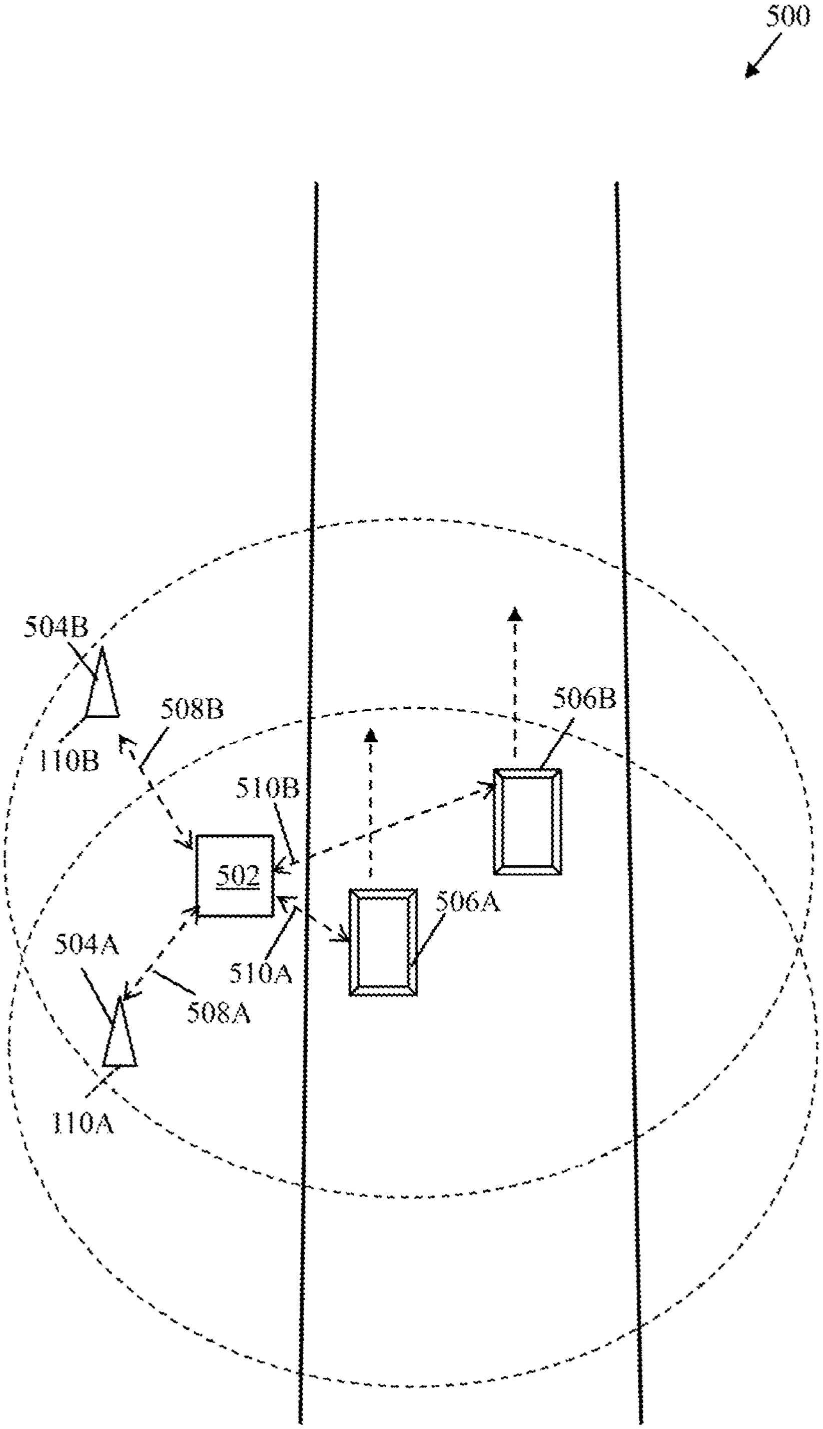
FIG. 5 is a second exemplary scenario for implementation of the edge device, the central cloud server, and the method for handling service for multiple service providers for high performance and reliable communication, in accordance with an embodiment of the disclosure.

FIG. 5 is a second exemplary scenario for implementation of the edge device, the central cloud server, and the method for handling service for multiple service providers for high performance and reliable communication, in accordance with an embodiment of the disclosure. FIG. 5 is explained in conjunction with elements from FIGS. 1, 2, 3, and 4. With reference to FIG. 5, there is shown a second exemplary scenario 500. The second exemplary scenario 500 includes a 5G-enabled road-side unit (RSU), hereinafter simply referred to as an RSU 502 that can concurrently handle services of multiple service providers, a first gNB 504A associated with the first WCN 110A of a first service provider, and a second gNB 504B associated with the second WCN 110B of a second service provider. There is further shown a road portion on which a first vehicle 506A and a second vehicle 506B may be in motion.

In the second exemplary scenario 500, the RSU 502 corresponds to the edge device 104A, the first vehicle 506A corresponds to the first UE 106A and the second vehicle 506B corresponds to the second UE 106B (FIGS. 1, 2A, and 2B). In an implementation, each of the first vehicle 506A and the second vehicle 506B may correspond to a 5G-enabled UE controlled by the central cloud server 102 and may have an application installed in it (e.g., installed in an in-vehicle infotainment system) which is communicatively coupled to the central cloud server 102 to receive its services. In operation, the RSU 502 may be configured to receive a first connection request from the first vehicle 506A associated with the first WCN 110A of the first service provider and a second connection request from the second vehicle 506B associated with the second WCN 110B of the second service provider. The RSU 502 may be further configured to obtain wireless connectivity enhanced information for the first vehicle 506A and the second vehicle 506B from the central cloud server 102 (FIGS. 1 and 3). Based on the obtained wireless connectivity enhanced information, the RSU 502 may be further configured to receive a first donor beam 508A from the first gNB 504A of the first WCN 110A and a second donor beam 508B from the second gNB 504B of the second WCN 110B. Thereafter, the RSU 502 may be further configured to concurrently direct a first beam of RF signal 510A in the first WCN 110A to the first vehicle 506A and a second beam of RF signal 510B in the second WCN 110B to the second vehicle 506B based on the obtained connectivity enhanced information for the first vehicle 506A and the second vehicle 506B. Thus, a single edge device, such as the RSU 502 in this case, is able to service multiple UEs in motion associated with different service providers, thereby reducing (i.e., optimizing) the total number of network nodes for each service provider required to be deployed or used in one or more geographical areas. Further, the RSU 502, by virtue of handling services of multiple service providers at the same time, ensures seamless connectivity as well as QoE while significantly reducing the infrastructure cost.

Figure 6:
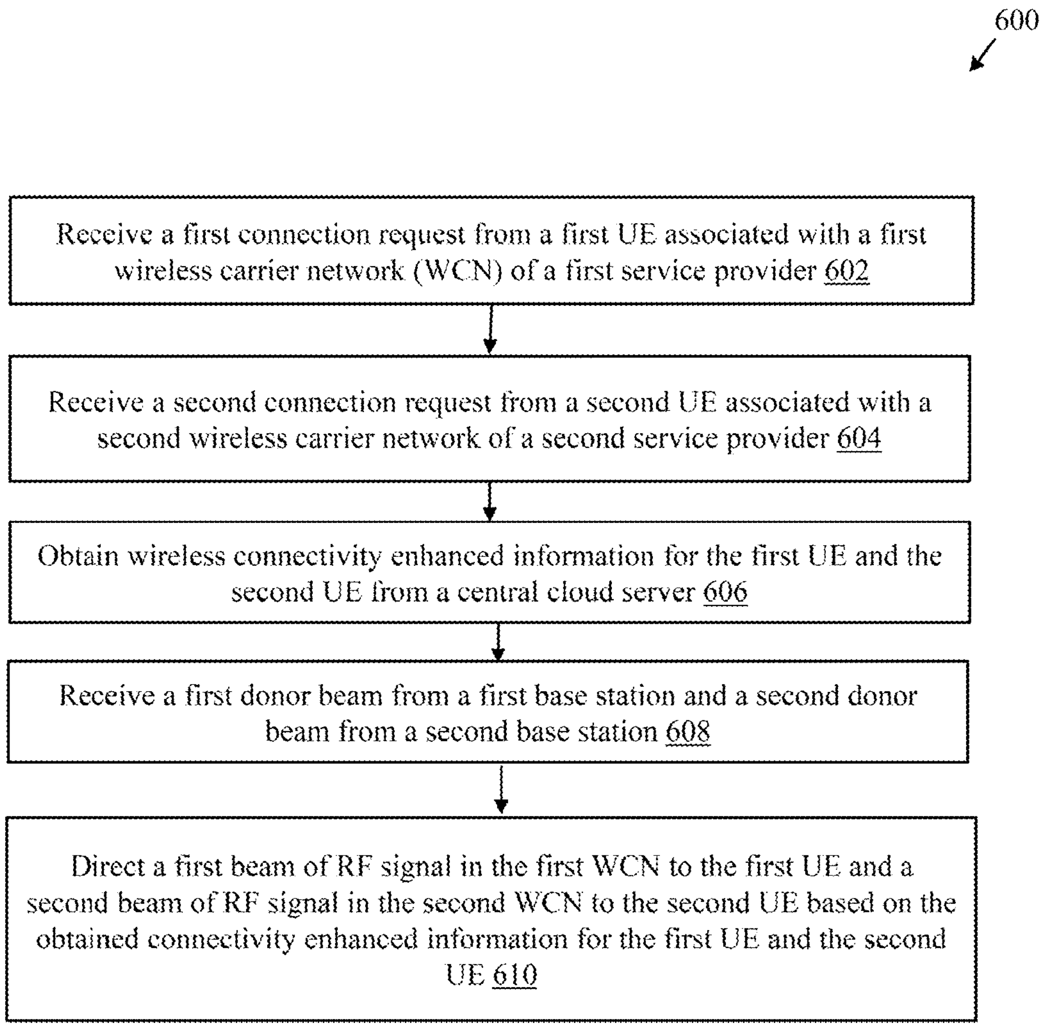
FIG. 6 is a flowchart that illustrates an exemplary method for handling service for multiple service providers for high performance and reliable communication, in accordance with an embodiment of the disclosure.

FIG. 6 is a flowchart that illustrates an exemplary method for handling service for multiple service providers for high performance and reliable communication, in accordance with an embodiment of the disclosure. FIG. 6 is explained in conjunction with elements from FIGS. 1, 2A, 2B, 3, 4, and 5. With reference to FIG. 6, there is shown a flowchart 600 comprising exemplary operations 602 through 610. The operations of the method depicted in the flowchart 600 may be implemented in the edge device 104A (FIG. 2A).

At 602, a first connection request may be received from the first UE 106A associated with the first WCN 110A of a first service provider. The control circuitry 214 may be configured to receive the first connection request from the first UE 106A associated with the first WCN 110A. In an example, the connection request may be received via an out-of-band communication, such as WI-FI™, BLUETOOTH™, Li-Fi, a sidelink request (e.g., LTE sidelink, 5G New Radio (NR) sidelink, NR C-V2X sidelink), a vehicle-to-infrastructure (V2I) request, a personal area network (PAN) connection, or other out-of-band connection requests. The first UE 106A may be identified as a priority user based on the connection request in order to prioritize servicing the first UE 106A.

At 604, a second connection request may be received from the second UE 106B associated with the second WCN 110B of a second service provider. The control circuitry 214 may be further configured to receive the second connection request from the second UE 106B associated with the second WCN 110B of the second service provider. In some implementations, a corresponding activation signal may be obtained from each of the first UE 106A and the second UE 106B, where the corresponding activation signal is generated at the first UE 106A and the second UE 106B using at least one of the application installed in the first UE 106A and the second UE 106B, an authentication key, or a registered gesture. Thereafter, the edge device 104A may be activated to service the first UE 106A and the second UE 106B based on an authentication of the corresponding activation signal. In some implementations, such corresponding activation signal from each of the first UE 106A and the second UE 106B may be a part of the first connection request and second connection request, respectively.

At 606, wireless connectivity enhanced information may be received for the first UE 106A and the second UE 106B from the central cloud server 102. In some implementations, the wireless connectivity enhanced information may be obtained from the central cloud server 102 based on a position of the edge device 104A, where the wireless connectivity enhanced information provided by the central cloud server 102 for the first UE 106A and the second UE 106B includes selected initial access information to accelerate a UE-specific beam alignment for each of the first UE 106A and the second UE 106B and connectivity to one or more base stations from the edge device 104A bypassing an initial access-search on the edge device 104A. The control circuitry 214 may be further configured to obtain wireless connectivity enhanced information for the first UE 106A and the second UE 106B from the central cloud server 102.

At 608, a first donor beam may be received from the first base station 108A and a second donor beam may be received from the second base station 108B. The control circuitry 214 may be further configured to receive the first donor beam from the first base station 108A and the second donor beam from the second base station 108B. In some implementations, the first donor beam may be directly received from the first base station 108A, whereas the second donor beam associated with the second base station 108B may be received from another edge device (such as the edge device 104B) that is a part of a network of edge devices, such as the plurality of edge devices 104.

At 610, a first beam of radio frequency (RF) signal in the first WCN 110A may be directed to the first UE 106A, and a second beam of RF signal in the second WCN 110B may be directed to the second UE 106B based on the obtained connectivity enhanced information for the first UE 106A and the second UE 106B. In an implementation, the first beam of RF signal in the first WCN 110A to the first UE 106A and the second beam of RF signal in the second WCN 110B to the second UE 106B are concurrently directed from the edge device 104A. In another implementation, the first beam of RF signal in the first WCN 110A to the first UE 106A and the second beam of RF signal in the second WCN 110B to the second UE 106B are alternatingly directed from the edge device 104A. The control circuitry 214 may be further configured to direct the first beam of radio frequency (RF) signal in the first WCN 110A to the first UE 106A and a second beam of RF signal in the second WCN 110B to the second UE 106B based on the obtained connectivity enhanced information for the first UE 106A and the second UE 106B. In accordance with an embodiment, the first beam of RF signal carries a first payload of a first data stream associated with the first WCN 110A to the first UE 106A and the second beam of RF signal carry at least one of a second payload of a second data stream associated with the second WCN 110B to the second UE 106B or a null payload associated with the second WCN 110B to the second UE 106B.

Figure 7:
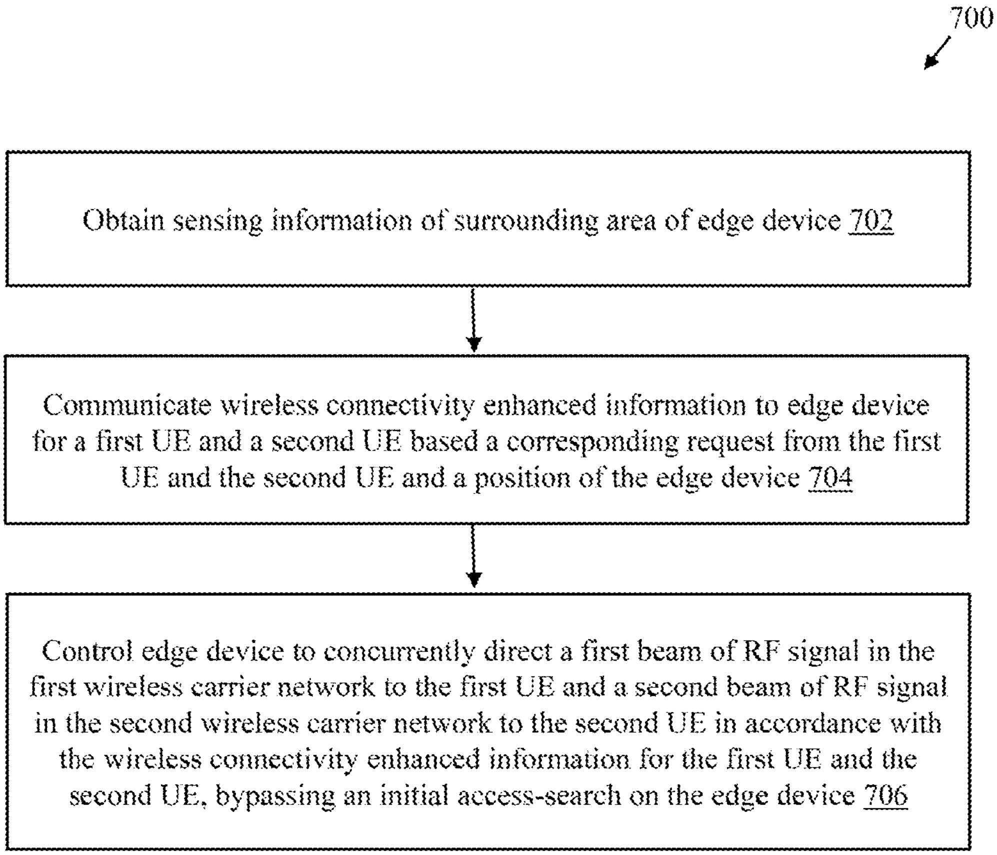
FIG. 7 is a flowchart that illustrates an exemplary method for handling service for multiple service providers for high performance and reliable communication, in accordance with another embodiment of the disclosure.

FIG. 7 is a flowchart that illustrates an exemplary method for handling service for multiple service providers for high performance and reliable communication, in accordance with an embodiment of the disclosure. FIG. 7 is explained in conjunction with elements from FIGS. 1, 2A, 2B, 3, 4, and 5. With reference to FIG. 7, there is shown a flowchart 700 comprising exemplary operations 702 to 706. The operations of the method depicted in the flowchart 700 may be implemented in a cloud server, such as the central cloud server 102 (FIGS. 1 and 3).

At 702, sensing information of a surrounding area of the edge device 104A may be obtained. The sensing information may be periodically or continually captured by the edge device 104A and communicated to the central cloud server 102. The processor 302 may be configured to obtain the sensing information of the surrounding area of the edge device 104A.

At 704, wireless connectivity enhanced information may be communicated to the edge device 104A for the first UE 106A and the second UE 106B based a corresponding request from the first UE 106A and the second UE 106B and a position of the edge device 104A. The processor 302 may be further configured to communicate the wireless connectivity enhanced information to the edge device 104A for the first UE 106A and the second UE 106B. The communication may be executed based on the corresponding request from the first UE 106A and the second UE 106B and the position of the edge device 104A. In some implementations, the communication may be executed based on the obtained sensing information. For example, the processor 302 may be further configured to determine, based on the position information of the edge device 104A, whether the handover is required, and if so, communicate the wireless connectivity enhanced information, including the specific initial access information to the edge device 104A to bypass the initial access-search on the edge device 104A.

At 706, the edge device 104A may be controlled to concurrently direct a first beam of radio frequency (RF) signal in the first WCN 110A to the first UE 106A, and a second beam of RF signal in the second WCN 110B to the second UE 106B in accordance with the wireless connectivity enhanced information for the first UE 106A and the second UE 106B, bypassing an initial access-search on the edge device 104A. The processor 302 may be further configured to control the edge device 104A to concurrently direct the first beam of RF signal in the first WCN 110A to the first UE 106A and the second beam of RF signal in the second WCN 110B to the second UE 106B in accordance with the wireless connectivity enhanced information for the first UE 106A and the second UE 106B.

Various embodiments of the disclosure may provide a non-transitory computer-readable medium having stored thereon, computer implemented instructions that when executed by a computer causes a communication apparatus to execute operations that include receiving a first connection request from the first UE 106A associated with the first WCN 110A of a first service provider. The operations further include receiving a second connection request from the second UE 106B associated with the second WCN 110B of a second service provider. The operations further include obtaining wireless connectivity enhanced information for the first UE 106A and the second UE 106B from the central cloud server 102. The operations further include directing a first beam of radio frequency (RF) signal in the first WCN 110A to the first UE 106A and a second beam of RF signal in the second WCN 110B to the second UE 106B based on the obtained connectivity enhanced information for the first UE 106A and the second UE 106B.

Various embodiments of the disclosure may provide a non-transitory computer-readable medium having stored thereon, computer implemented instructions that when executed by a computer causes the computer to execute operations that include communicating wireless connectivity enhanced information to the edge device 104A for the first UE 106A and the second UE 106B based a corresponding request from the first UE 106A and the second UE 106B and a position of the edge device 104A. The operations further include controlling the edge device 104A to concurrently direct a first beam of radio frequency (RF) signal in the first WCN 110A to the first UE 106A and a second beam of RF signal in the second WCN 110B to the second UE 106B in accordance with the wireless connectivity enhanced information for the first UE 106A and the second UE 106B, bypassing an initial access-search on the edge device 104A.

Various embodiments of the disclosure may be the edge device 104A, for example, a relay device, a small cell, or a repeater device. The edge device 104A comprises control circuitry 214 configured to receive a first connection request from the first UE 106A associated with the first WCN 110A of a first service provider. The control circuitry 214 may be further configured to receive a second connection request from the second UE 106B associated with the second WCN 110B of a second service provider. The control circuitry 214 may be further configured to obtain wireless connectivity enhanced information for the first UE 106A and the second UE 106B from the central cloud server 102. The control circuitry 214 may be further configured to direct a first beam of radio frequency (RF) signal in the first WCN 110A to the first UE 106A and a second beam of RF signal in the second WCN 110B to the second UE 106B based on the obtained connectivity enhanced information for the first UE 106A and the second UE 106B.

In accordance with an embodiment, the edge device 104A has the donor side 202A facing towards the plurality of base stations 108 and the service side 202B facing towards a plurality of UEs, and where each of the donor side 202A and the service side 202B of the edge device 104A comprises a plurality of signal processing chains, where each signal processing chain of the plurality of signal processing chains is associated with one wireless carrier network to segregate an uplink and a downlink communication of RF signals from the first WCN 110A with the second WCN 110B, and where each of the plurality of signal processing chains at the donor side 202A and the service side 202B is controlled by the control circuitry 214.

In accordance with an alternative embodiment, each of the donor side 202A and the service side 202B of the edge device 104A comprises a signal processing chain configured to alternatively process RF signals from the first WCN 110A and the second WCN 110B in a switching pattern under the control of the control circuitry 214.

Various embodiments of the disclosure may comprise the central cloud server 102 (FIG. 1). The central cloud server 102 comprises the processor 302 configured to communicate wireless connectivity enhanced information to the edge device 104A for the first UE 106A and the second UE 106B based a corresponding request from the first UE 106A and the second UE 106B and a position of the edge device 104A. The processor 302 may be further configured to control the edge device 104A to concurrently direct a first beam of radio frequency (RF) signal in the first WCN 110A to the first UE 106A and a second beam of RF signal in the second WCN 110B to the second UE 106B in accordance with the wireless connectivity enhanced information for the first UE 106A and the second UE 106B, bypassing an initial access-search on the edge device 104A.

While various embodiments described in the present disclosure have been described above, it should be understood that they have been presented by way of example, and not limitation. It is to be understood that various changes in form and detail can be made therein without departing from the scope of the present disclosure. In addition to using hardware (e.g., within or coupled to a central processing unit ("CPU"), microprocessor, microcontroller, digital signal processor, processor core, system on chip ("SOC") or any other device), implementations may also be embodied in software (e.g., computer readable code, program code, and/or instructions disposed in any form, such as source, object or machine language) disposed for example in a non-transitory computer-readable medium configured to store the software. Such software can enable, for example, the function, fabrication, modeling, simulation, description and/or testing of the apparatus and methods describe herein. For example, this can be accomplished through the use of general program languages (e.g., C, C++), hardware description languages (HDL) including Verilog HDL, VHDL, and so on, or other available programs. Such software can be disposed in any known non-transitory computer-readable medium, such as semiconductor, magnetic disc, or optical disc (e.g., CD-ROM, DVD-ROM, etc.). The software can also be disposed as computer data embodied in a non-transitory computer-readable transmission medium (e.g., solid state memory any other non-transitory medium including digital, optical, analog-based medium, such as removable storage media). Embodiments of the present disclosure may include methods of providing the apparatus described herein by providing software describing the apparatus and subsequently transmitting the software as a computer data signal over a communication network including the internet and intranets.

It is to be further understood that the system described herein may be included in a semiconductor intellectual property core, such as a microcontroller (e.g., embodied in HDL) and transformed to hardware in the production of integrated circuits. Additionally, the system described herein may be embodied as a combination of hardware and software. Thus, the present disclosure should not be limited by any of the above-described exemplary embodiments, but should be defined only in accordance with the following claims and their equivalents.

What is claimed is:

1. A central cloud server, comprising:

a processor configured to:

obtain sensing information from a plurality of edge devices at different locations;

obtain beam alignment information from the plurality of edge devices; and train a machine learning model on training data, wherein the training data comprises the obtained sensing information as input features and the beam alignment information as learning labels for different times-of-day, the machine learning model is trained to determine patterns that maps the input features to the learning labels and to generate a connectivity enhanced database, and the connectivity enhanced database specifies a plurality of time-of-day specific uplink and downlink beam alignment-wireless connectivity relationships for a surrounding area of each edge device of the plurality of edge devices.

2. The central cloud server according to claim 1, wherein the processor is further configured to correlate the obtained sensing information and the beam alignment information for the different times-of-day to generate the connectivity enhanced database.

3. The central cloud server according to claim 2, wherein the input features comprise a distance of each edge device of the plurality of edge devices from User Equipment (UE), weather condition, a UE location, a moving direction of the UE, and a time-of-day.

4. The central cloud server according to claim 2, wherein the learning labels comprise initial access information, a Physical Cell Identity (PCID), a signal strength measurement of a Tx/Rx beam, a beam configuration, a transmission path, and an absolute radio-frequency channel number (ARFCN).

5. The central cloud server according to claim 2, wherein the machine learning model comprises a convolutional neural network (CNN).

6. The central cloud server according to claim 1, wherein the processor is further configured to obtain processing chain parameters from the plurality of edge devices, wherein the processing chain parameters are additional parameters included in the learning labels in addition to the beam alignment information.

7. The central cloud server according to claim 6, wherein the processor is further configured to correlate the processing chain parameters with the obtained sensing information and the beam alignment information for the different times-of-day to update the generated connectivity enhanced database.

8. The central cloud server according to claim 1, wherein the plurality of time-of-day specific uplink and downlink beam alignment-wireless connectivity relationships comprise one or more of a transmit (Tx) beam information, a receive (Rx) beam information, a Physical Cell Identity (PCID), an absolute radio-frequency channel number (ARFCN), and a signal strength information associated with each of a Tx beam and an Rx beam of the plurality of edge devices.

9. The central cloud server according to claim 1, wherein the plurality of time-of-day specific uplink and downlink beam alignment-wireless connectivity relationships specify, for a set of the input features for a time-of-day of the different times-of-day, a beam index to set at a first edge device for uplink communication, a specific Physical Cell Identity (PCID) that indicates a gNB to connect to, or a selection of a Wireless Communication Network, a specific beam configuration to set, or a decision to connect to a base station directly or indirectly in a Non-Line-of-Sight (NLOS) path via a second edge device in a network of the plurality of edge devices, the decision is based on a current location of the second edge device, and each of the first edge device and the second edge device is one of the plurality of edge devices.

10. The central cloud server according to claim 1, wherein the plurality of time-of-day specific uplink and downlink beam alignment-wireless connectivity relationships specify, for a set of the input features for a time-of-day of the different times-of-day, a beam index to set at a first edge device for downlink communication, a selection of a Wireless Communication Network (WCN), a specific beam configuration to set, a power level of RF signal, or an expected time period to service one or more User Equipment (UEs) based on a current location of the first edge device, and the first edge device is one of the plurality of edge devices.

11. The central cloud server according to claim 1, wherein the processor is further configured to correlate the obtained sensing information and the beam alignment information for the different times-of-day to generate the connectivity enhanced database, the correlation indicates, for the input features in the sensing information, initial access information suitable for a first edge device to service one or more User Equipment (UEs) in the surrounding area, and the first edge device is one of the plurality of edge devices.

12. A method, comprising:

in a central cloud server:

obtaining sensing information from a plurality of edge devices at different locations;

obtaining beam alignment information from the plurality of edge devices; and training a machine learning model on training data, wherein the training data comprises the obtained sensing information as input features and the beam alignment information as learning labels for different times-of-day, the machine learning model is trained to determine patterns that maps the input features to the learning labels and to generate a connectivity enhanced database, and the connectivity enhanced database specifies a plurality of time-of-day specific uplink and downlink beam alignment-wireless connectivity relationships for a surrounding area of each edge device of the plurality of edge devices.

13. The method according to claim 12, further comprising correlating the obtained sensing information and the beam alignment information for the different times-of-day to generate the connectivity enhanced database.

14. The method according to claim 13, wherein the input features comprise a distance of each edge device of the plurality of edge devices from User Equipment (UE), weather condition, a UE location, a moving direction of the UE, and a time-of-day.

15. The method according to claim 13, wherein the learning labels comprise initial access information, a Physical Cell Identity (PCID), a signal strength measurement of a Tx/Rx beam, a beam configuration, a transmission path, and an absolute radio-frequency channel number (ARFCN).

16. The method according to claim 13, wherein the machine learning model comprises a convolutional neural network (CNN).

17. The method according to claim 12, further comprising obtaining, by the central cloud server, processing chain parameters from the plurality of edge devices, wherein the processing chain parameters are additional parameters included in the learning labels in addition to the beam alignment information.

18. The method according to claim 17, further comprising correlating, by the central cloud server, the processing chain parameters with the obtained sensing information and the beam alignment information for the different times-of-day to update the generated connectivity enhanced database.

19. The method according to claim 12, wherein the plurality of time-of-day specific uplink and downlink beam alignment-wireless connectivity relationships comprise one or more of a transmit (Tx) beam information, a receive (Rx) beam information, a Physical Cell Identity (PCID), an absolute radio-frequency channel number (ARFCN), and a signal strength information associated with each of a Tx beam and an Rx beam of the plurality of edge devices.

20. The method according to claim 12, wherein the plurality of time-of-day specific uplink and downlink beam alignment-wireless connectivity relationships specify, for a set of the input features for a time-of-day of the different times-of-day, a beam index to set at a first edge device for uplink communication, a specific Physical Cell Identity (PCID) that indicates a gNB to connect to, or a selection of a Wireless Communication Network, a specific beam configuration to set, or a decision to connect to a base station directly or indirectly in a Non-Line-of-Sight (NLOS) path via a second edge device in a network of the plurality of edge devices, the decision is based on a current location of the second edge device, and each of the first edge device and the second edge device is one of the plurality of edge devices.

* * * * *